June 16, 1931. L. SCHMIDT 1,810,298
APPLIANCE FOR THE AUTOMATIC DETERMINATION OF THE RANGE FACTORS FOR
COMBATING AIRCRAFT WITH GUNS HAVING TWO OR THREE AXES
AND MOUNTED ON MOVING PLATFORMS
Filed Dec. 29, 1928  26 Sheets-Sheet 4

Inventor:
Leopold Schmidt
By Emil Bönnelycke
Attorney

Inventor,
Leopold Schmidt,
By Emil Bönnelycke
Atty.

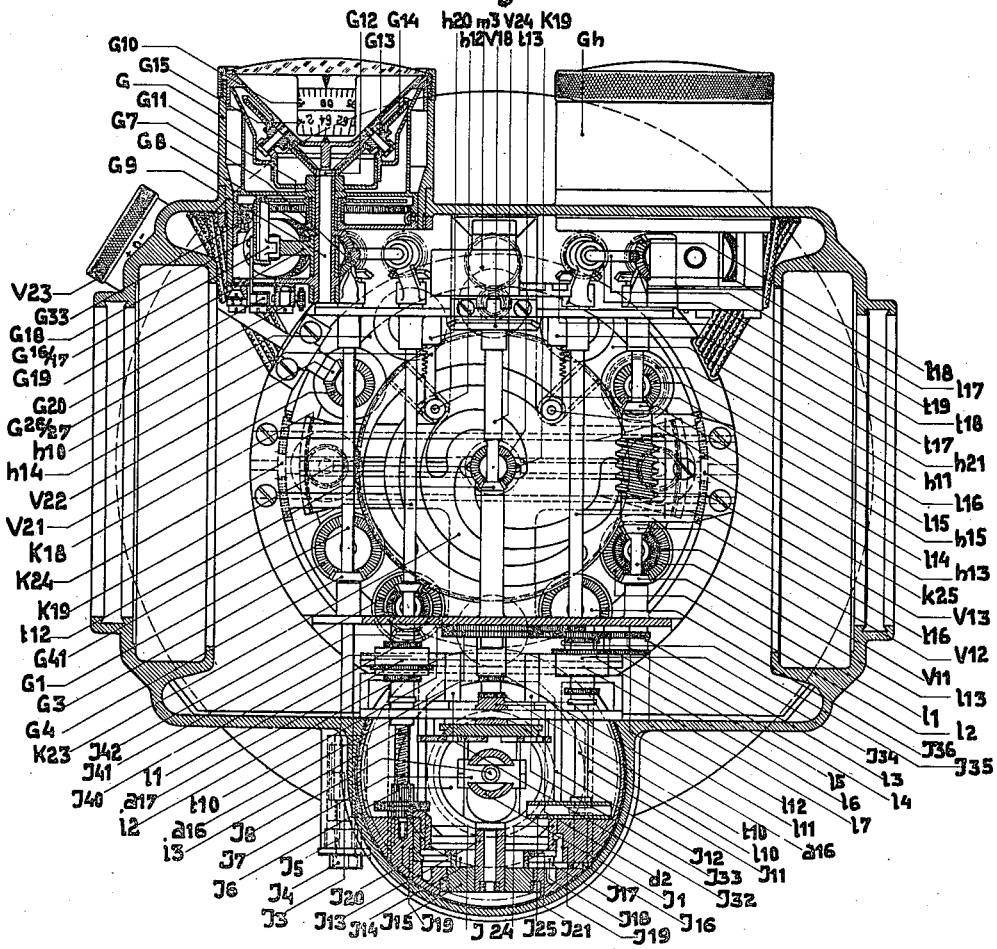

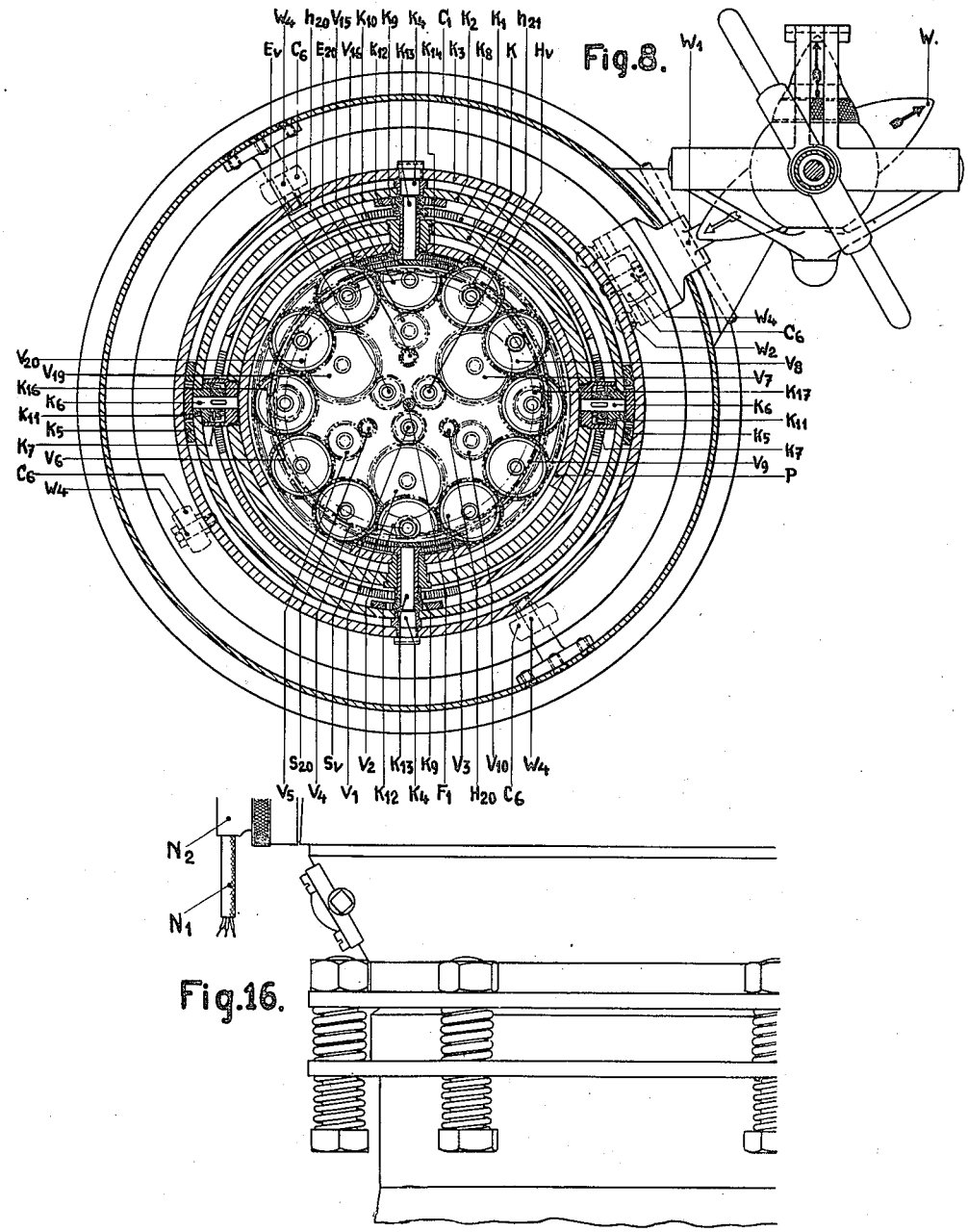

Inventor:
Leopold Schmidt,
By Emil Bonnelycke
Atty.

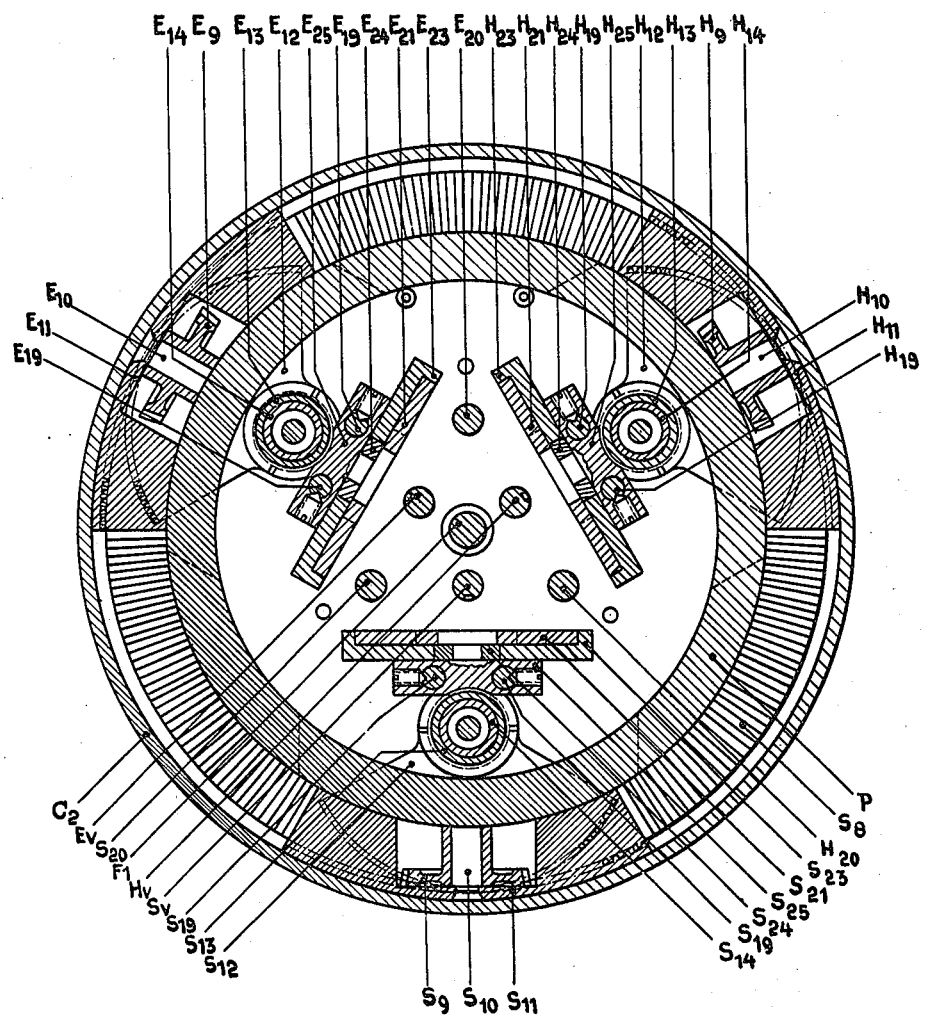

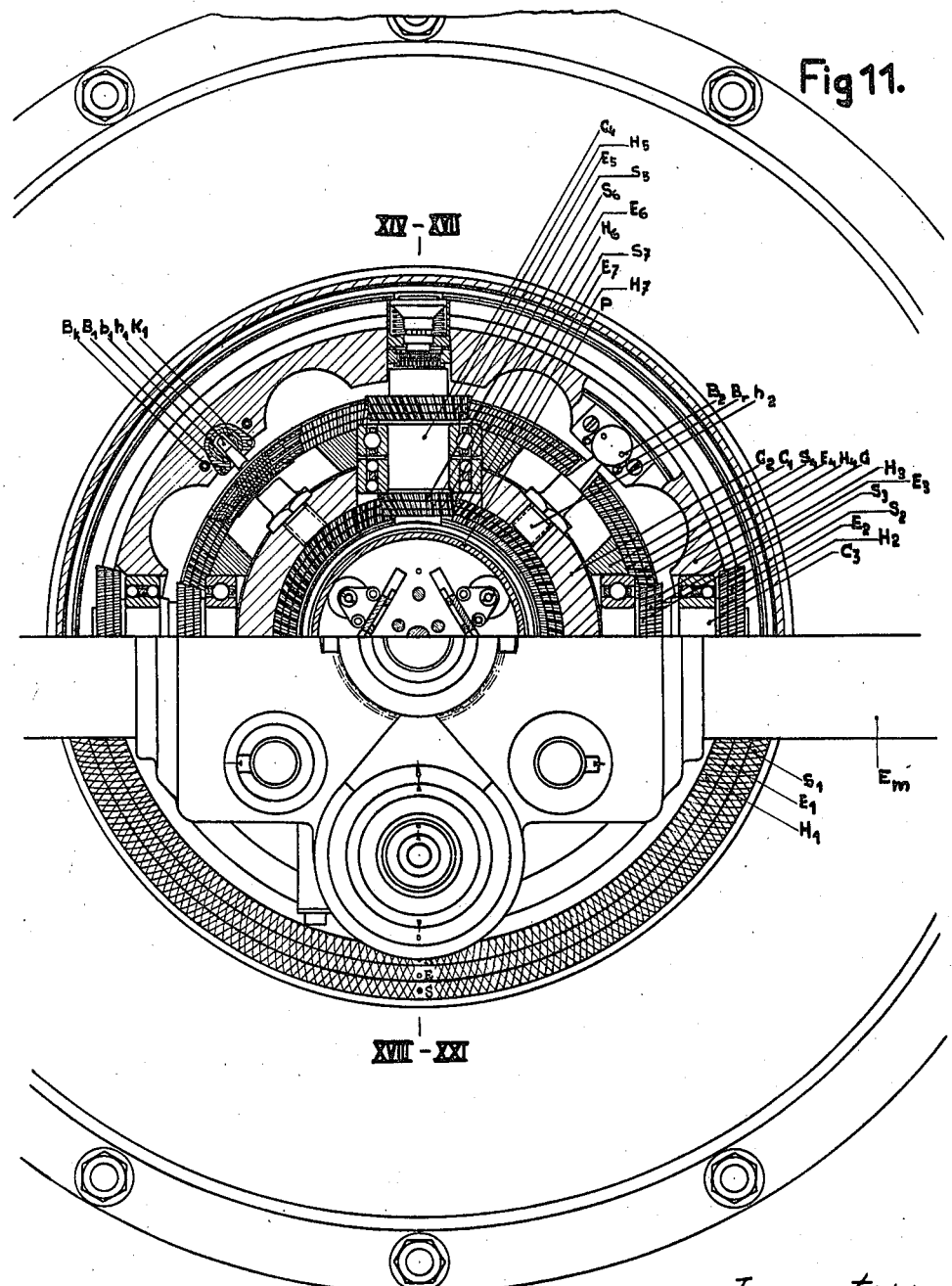

June 16, 1931.  L. SCHMIDT  1,810,298
APPLIANCE FOR THE AUTOMATIC DETERMINATION OF THE RANGE FACTORS FOR
COMBATING AIRCRAFT WITH GUNS HAVING TWO OR THREE AXES
AND MOUNTED ON MOVING PLATFORMS
Filed Dec. 29, 1928    26 Sheets-Sheet 12

Inventor,
Leopold Schmidt,
By Emil Bonnelycke Atty.

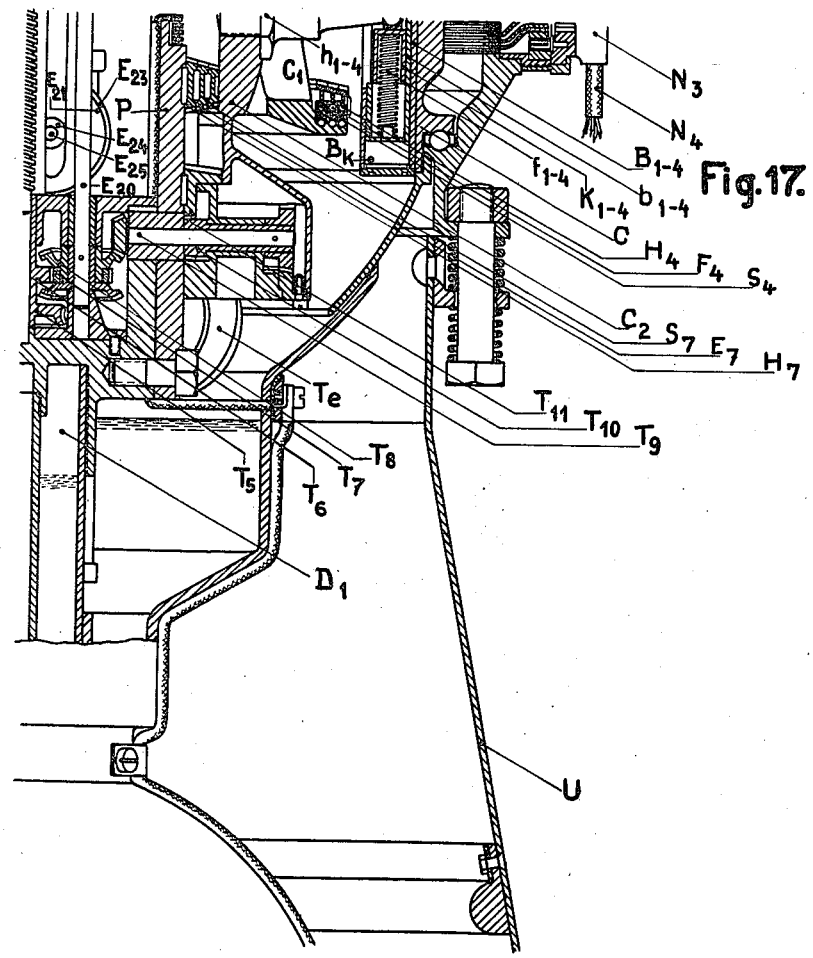

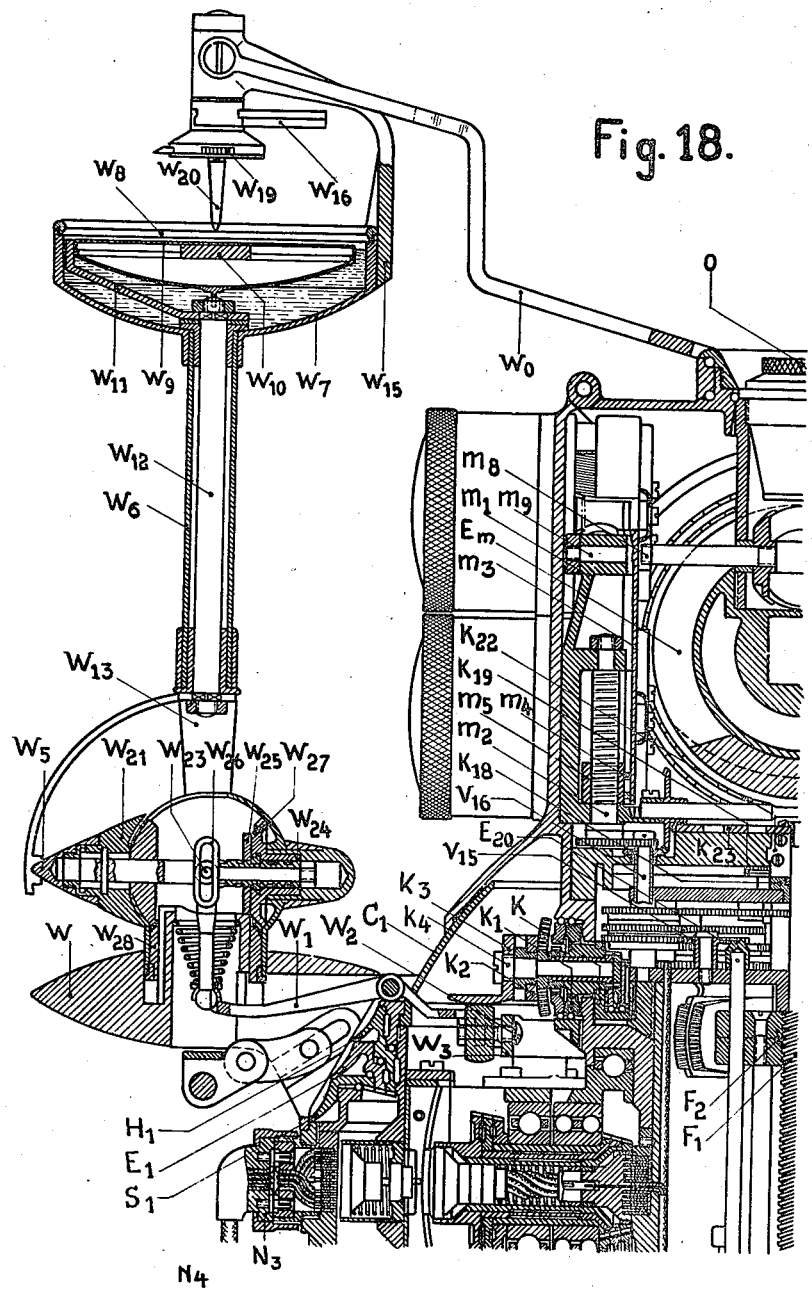

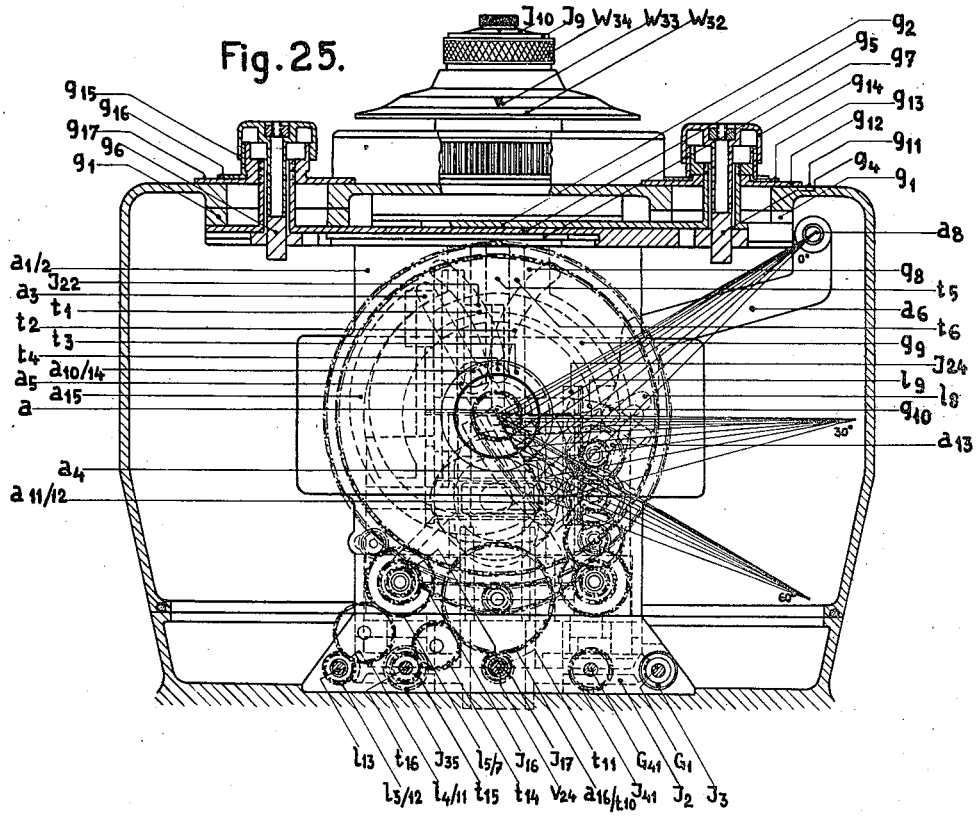

June 16, 1931. L. SCHMIDT 1,810,298
APPLIANCE FOR THE AUTOMATIC DETERMINATION OF THE RANGE FACTORS FOR
COMBATING AIRCRAFT WITH GUNS HAVING TWO OR THREE AXES
AND MOUNTED ON MOVING PLATFORMS
Filed Dec. 29, 1928 26 Sheets-Sheet 22
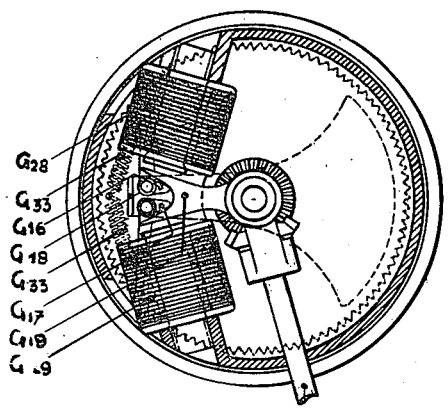
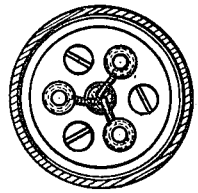
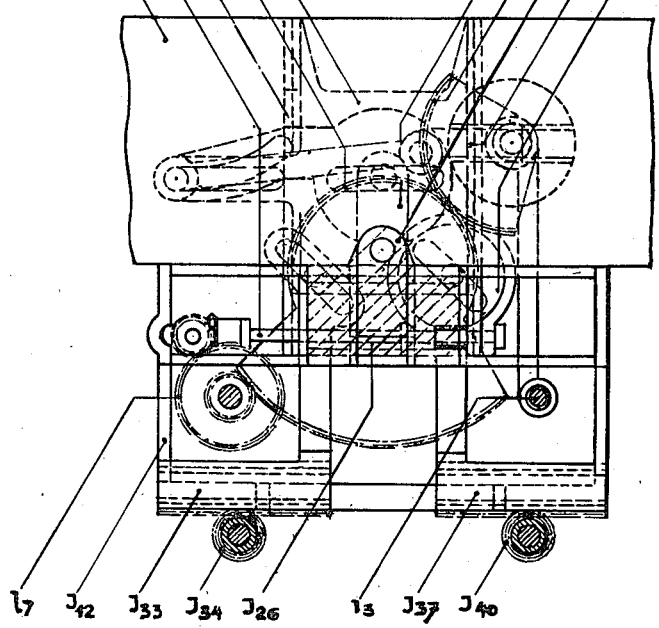
Inventor:
Leopold Schmidt
By
Attorney.

Inventor:
Leopold Schmidt
By
Attorney.

June 16, 1931.　　　　　L. SCHMIDT　　　　　1,810,298
APPLIANCE FOR THE AUTOMATIC DETERMINATION OF THE RANGE FACTORS FOR
COMBATING AIRCRAFT WITH GUNS HAVING TWO OR THREE AXES
AND MOUNTED ON MOVING PLATFORMS
Filed Dec. 29, 1928　　　26 Sheets-Sheet 25

Inventor:
Leopold Schmidt
By
Attorney.

Patented June 16, 1931

1,810,298

UNITED STATES PATENT OFFICE

LEOPOLD SCHMIDT, OF THE HAGUE, NETHERLANDS, ASSIGNOR TO NAAMLOOZE VENNOOTSCHAP HOLLANDSCHE INDUSTRIEEN HANDELMAATSCHAPPIJ, OF THE HAGUE, NETHERLANDS, A CORPORATION OF THE NETHERLANDS

APPLIANCE FOR THE AUTOMATIC DETERMINATION OF THE RANGE FACTORS FOR COMBATING AIRCRAFT WITH GUNS HAVING TWO OR THREE AXES AND MOUNTED ON MOVING PLATFORMS

Application filed December 29, 1928, Serial No. 329,125, and in the Netherlands and Germany December 31, 1927.

Literary and constructive works have not been wanting, in which range-finding methods, which have been employed for shooting at land and sea targets, have also been put forward for combating air targets; the transfer of the shooting factors obtained on the level to three dimensional space, however, involves in itself such great difficulties that the gunner with the aid of the current technical methods hitherto available cannot succeed in attaining reliable effective shooting in the extremely short space of time during which the target is in range of the gun. All apparatus so far known always requires the insertion of more or less rough corrections by the firing controller and on this account wide limits are left open to susceptibility.

The reasons for the insertion of such expedients as these corrections are obvious. On the level for a certain gun and a given shot "angle of tangent scale, rifling and flight time" are known constants for each distance, which distance can be very much more easily fixed for ground targets than for targets in the air, with the aid, by the way, of many favourable auxiliary circumstances, particularly through the possibility of good observation of the effect of the fire; but in shooting at an air target all three are variable and must be adjusted from time to time to conform to the position angle. Further, the deviation of the target sideways, upwards or in the distance, determined from the co-ordinates of two or three measurements, cannot be used without correction in determining the estimated course to be taken to the probable point of the target, and the projectile's period of flight is thereby obtained only indirectly. One has, therefore, to deal here, so to speak, with the solution of indeterminate equations which may lead the firing-controller, in his work with curves and tables, to a rough mathematical result, but not to a correct valuation of the measurements and observations of the course of shooting, or, on the other hand, force him to increase his allowances in determining the correct adjustments, thereby decreasing the possible number of shots or hits. In the same manner as by the allowances for the movement of the target while the command is given, the charge inserted, and during the projectile's period of flight, the determination of the various shooting factors is also rendered difficult by the influences of the day; because the rapid change of location and direction of the flight also necessitates continuous change in the drift of the projectile, and according to the direction of the shooting, the wind, and the flight, all three co-ordinates, "lateral direction, angle of elevation and distance", are influenced by them.

But shooting at air targets is rendered particularly difficult if the weapons are mounted on a moving platform as, for example, on ships, airships or large aeroplanes. In this case travel, rolling and pitch in the carrier vehicle or craft are also to be included in the factors, in order to be ready for action at any moment independently of the position of the weapon from time to time, as is absolutely necessary on account of the brevity of the period during which the target can be shot at.

The same conditions prevail during land firing if firing is directed from a moving command platform, i. e. one mounted on an automobile. Even if continuous adjustments with regard to lateral deviation and travel do not have to be made, care must be taken to ensure that the command platform can be placed in a horizontal position without difficulty, and also oriented with regard to the gun platforms, i. e. brought into line with the weapons as far as lateral direction is concerned, and adjusted rapidly for the elimination of parallax even with regard to the various intervening distances such as the distance between command platform and gun. And, among others, there is a further disturbing factor to be taken into account here, namely, that the weapons destined to combat air targets may vary with regard to the number of shots, and their ballistic capacity may therefore deviate to a more or less considerable extent from the shooting tables. Various $v_0$-corrections must be provided in respect of this also.

As a result of all these complications it is sufficiently apparent that it will only be possible to arrive at a satisfactory shooting effect, if the firing controller is released from all mathematical combinations, and has only to direct his attention to observation, and the shooting factors fixed in connection with the direction of the gun quite automatically.

In the present invention this method of automatically including all the data which influence the shooting factors is followed up to the last moment of the automatic firing of the shot, and thereby all the defects are removed which attain to the apparatus and shooting methods hitherto used. The space direction appliance thus fixes the shooting factors correctly and automatically from the instant of cutting in on a target, for the appropriate gun position, even under the most difficult conditions, and gives them direct and uninterruptedly to the guns.

The accompanying drawings show as follows:

Fig. 7 is a sectional view of the reverse pendulum head taken on line VII—VII of Fig. 1.

Fig. 8 is a sectional view of the adding device taken on line VIII—VIII of Figs. 3 and 4.

Fig. 10 is a sectional view of the control mechanism taken on line X—X of Figs. 3 and 4.

Fig. 11 is a ground plan view, one-half thereof being in section taken on line XI—XI of Figs. 3 and 4.

Fig. 16 is a side elevation of the lower left side portion of the appliance.

Fig. 17 is a sectional view of the lower right side portion of the appliance.

Figs. 18, 19, 20 and 21 are sectional views of the upper left, upper right, lower left and lower right, respectively, side portions of the appliance through a certain part thereof.

Fig. 25 is a side and part sectional view of the shooting table corrector with drives.

Fig. 26 is a detail view of a portion of Fig. 24.

Fig. 28 is a detail view of Fig. 25.

Fig. 29 is an inner view of the contact plug shown at the lower right of Fig. 19.

Figure 1:
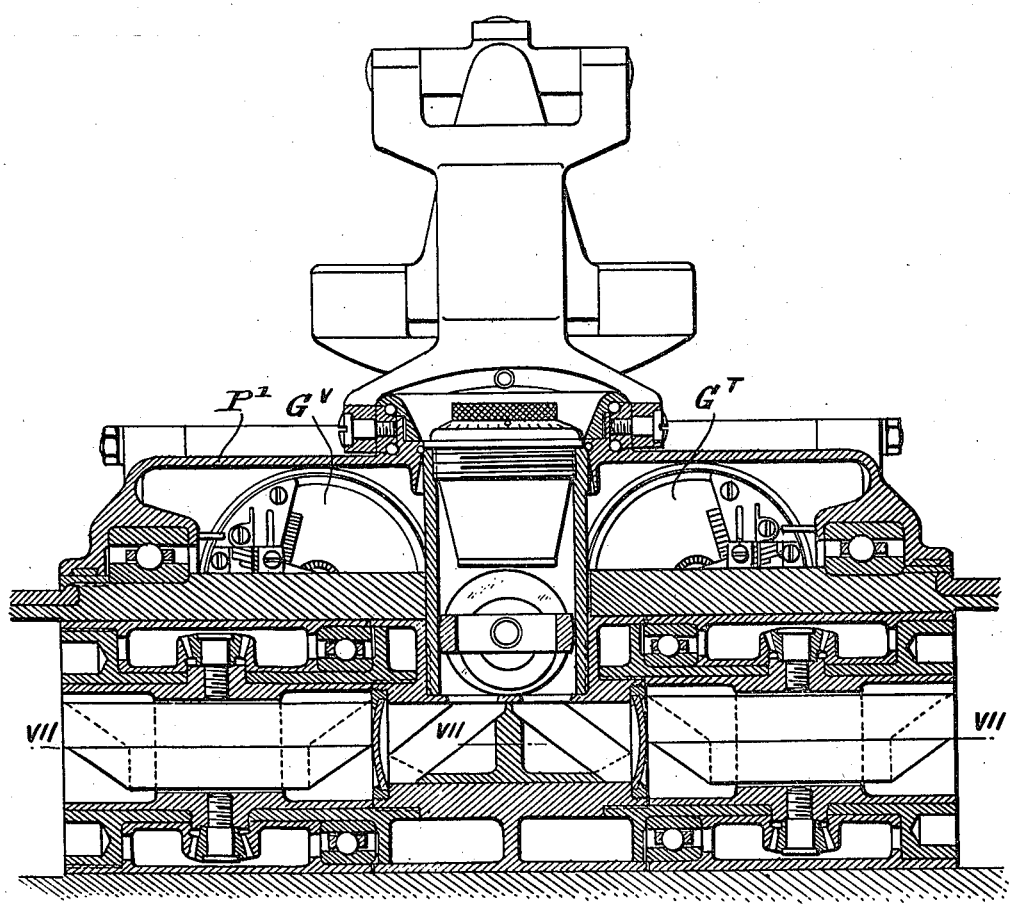
Figure 1 is a vertical longitudinal section seen from the rear of the upper portion of a space direction appliance in accordance with the invention.
Figure 2:
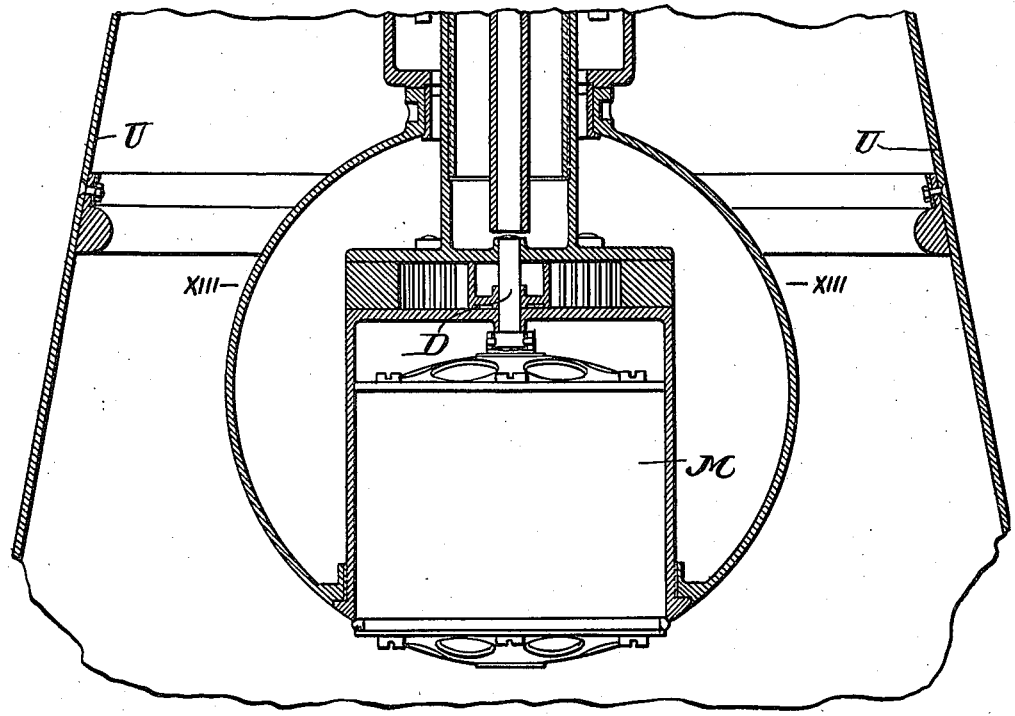
Fig. 2 is a similar view of the lower portion.
Figure 3:
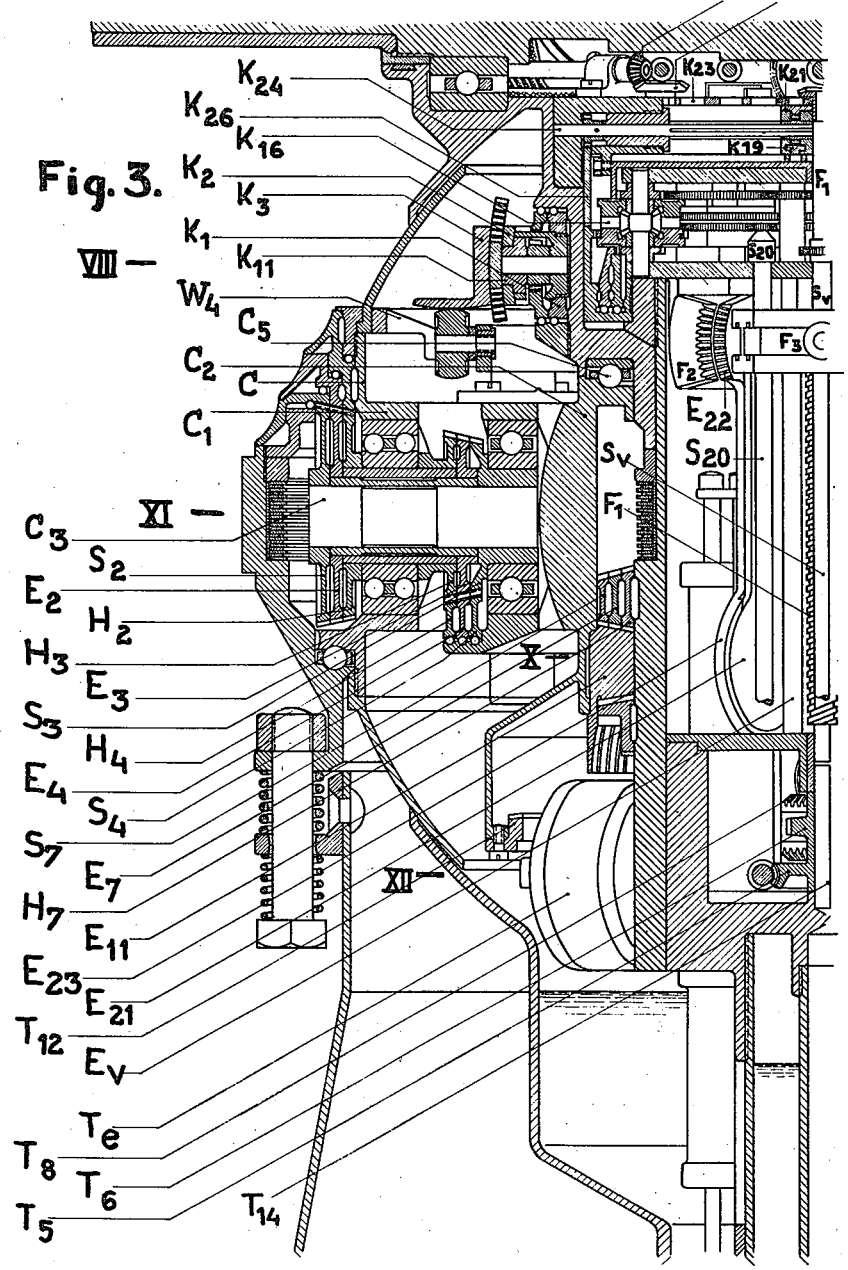
Fig. 3 is a similar view of the middle left side portion.
Figure 4:
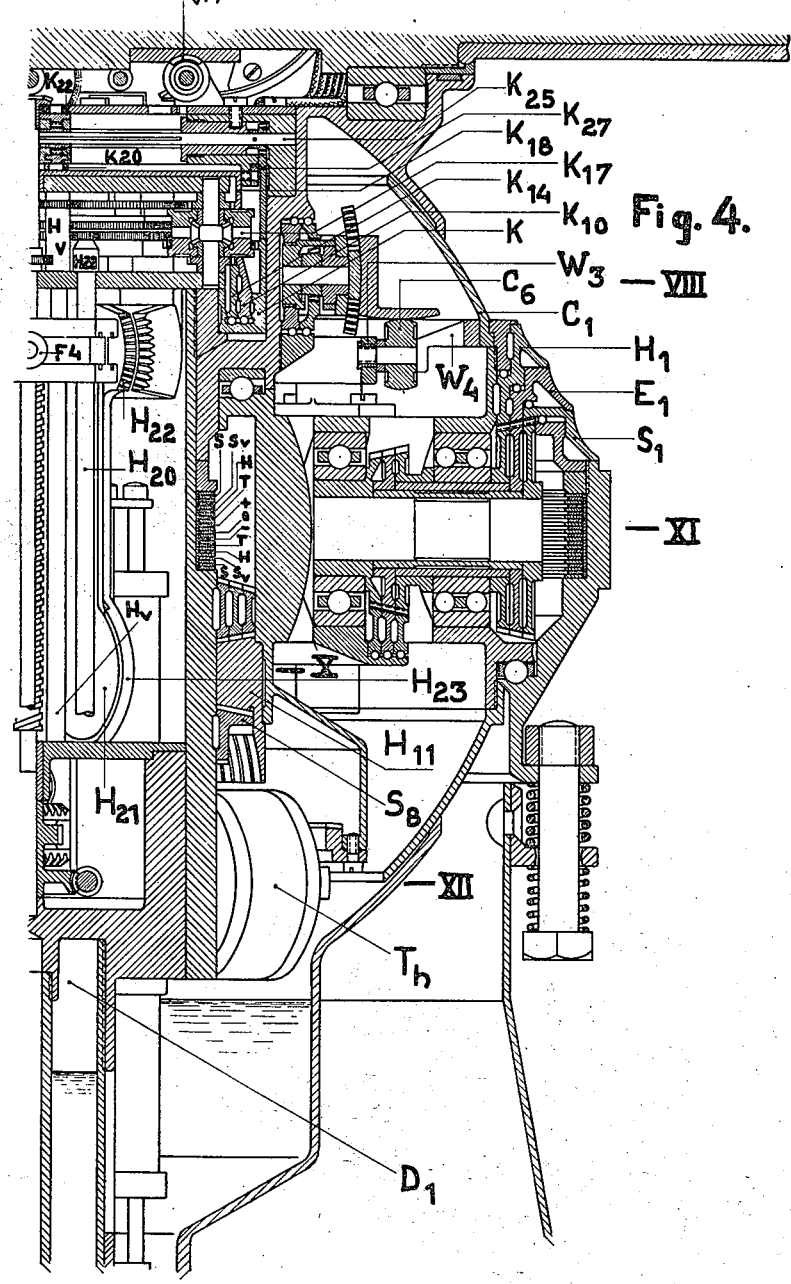
Fig. 4 is a similar view of the middle right side portion.
Figure 6:
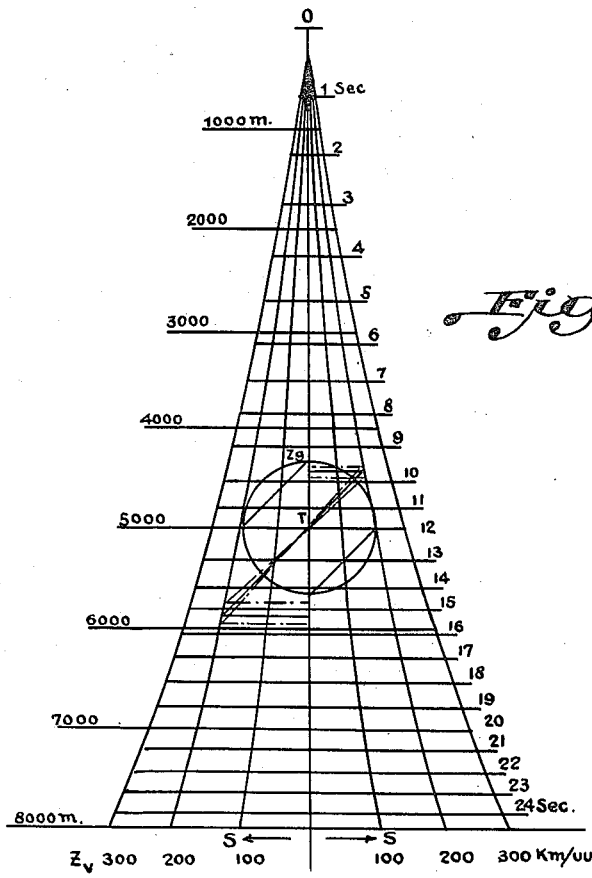
Fig. 6 is a diagram for the working method of the retardation factors.
Figure 5:
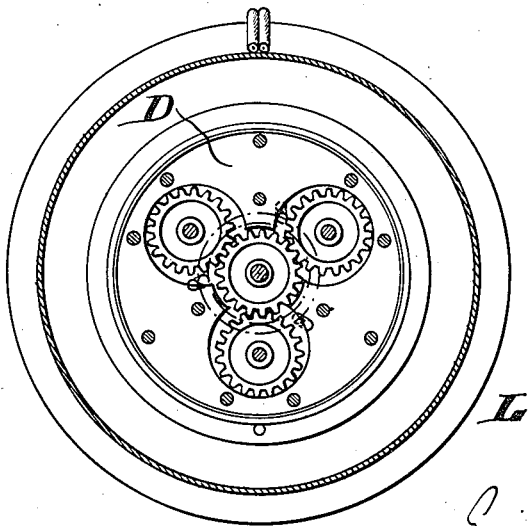
Fig. 5 is a section of the pressure pump taken on line XIII—XIII of Fig. 2.
Figure 9:
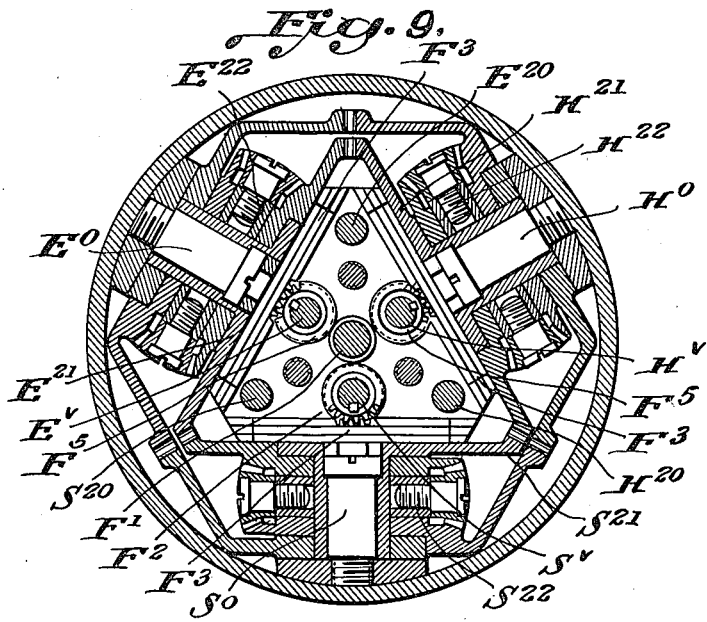
Fig. 9 is a sectional view of the retarding device taken on line IX—IX of Figs. 3 and 4.
Figure 13:
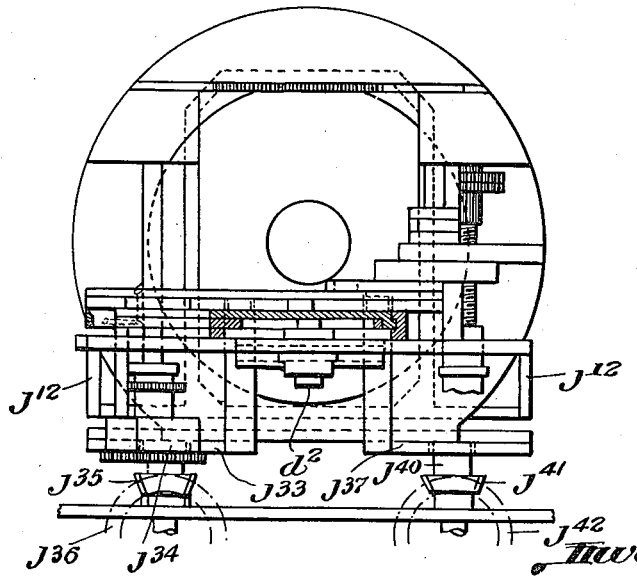
Fig. 13 is a detail view of Fig. 7.
Figure 12:
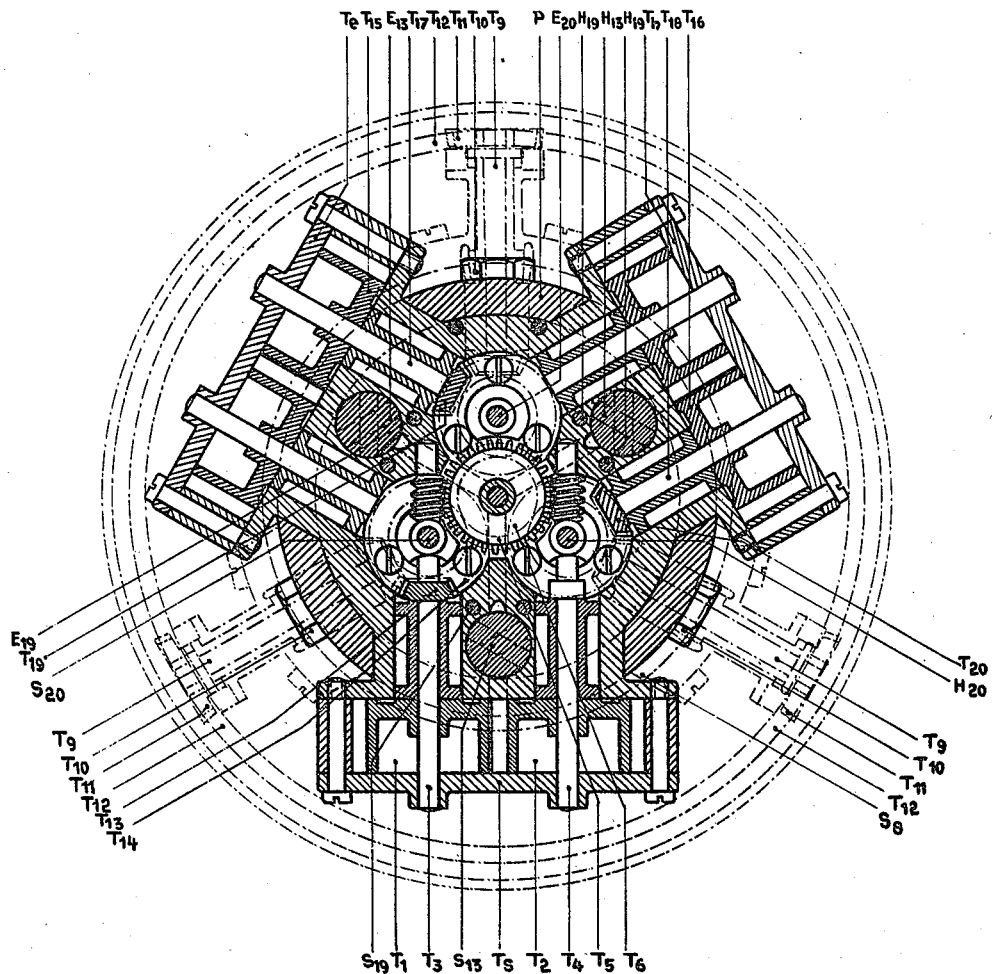
Fig. 12 is a section of the driving mechanism taken on line XII—XII of Figs. 3 and 4.
Figure 27:
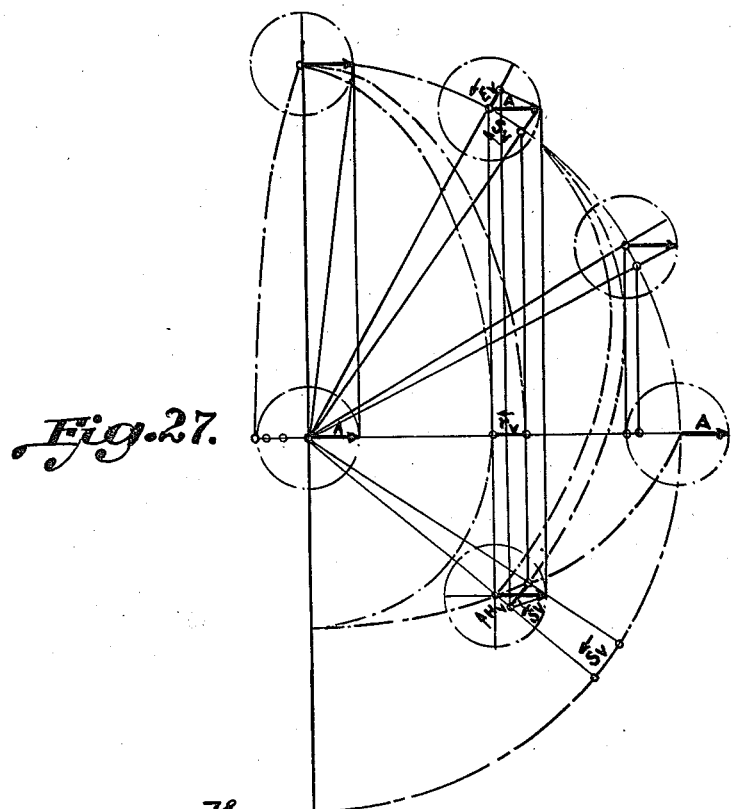
Fig. 27 is a diagram for the working method of the drift.
Figure 14:
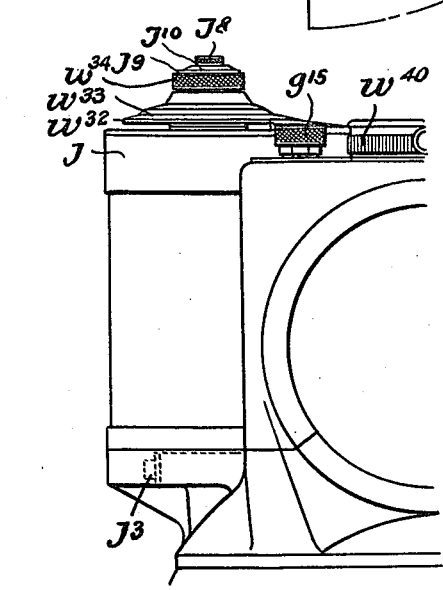
Fig. 14 is a side elevation of the upper left side portion of the appliance seen from a different angle than Fig. 1.
Figure 15:
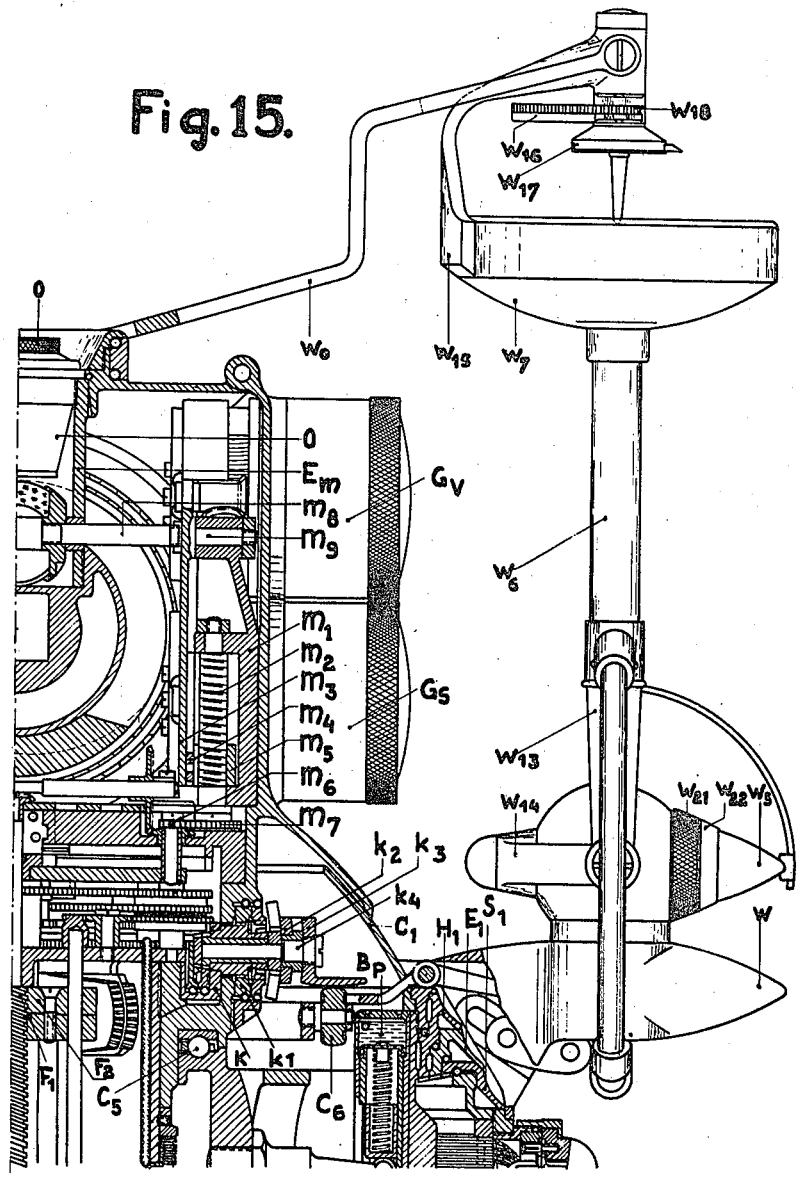
Fig. 15 is a sectional view of the upper right side portion of the appliance corresponding to Fig. 14.
Figure 19:
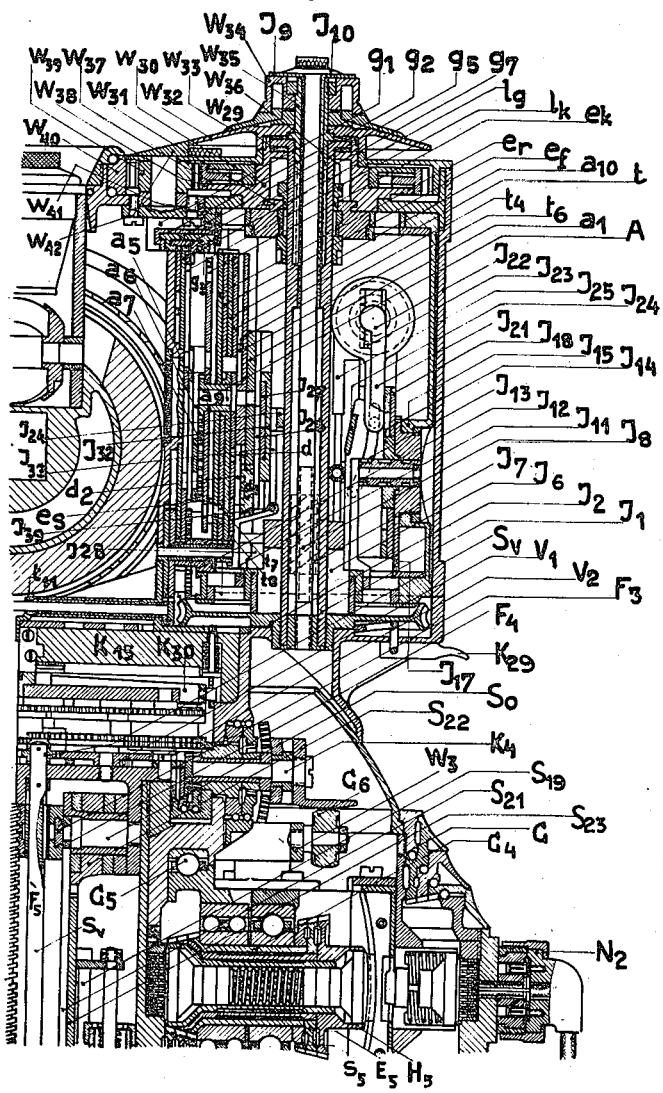
Figure 20:
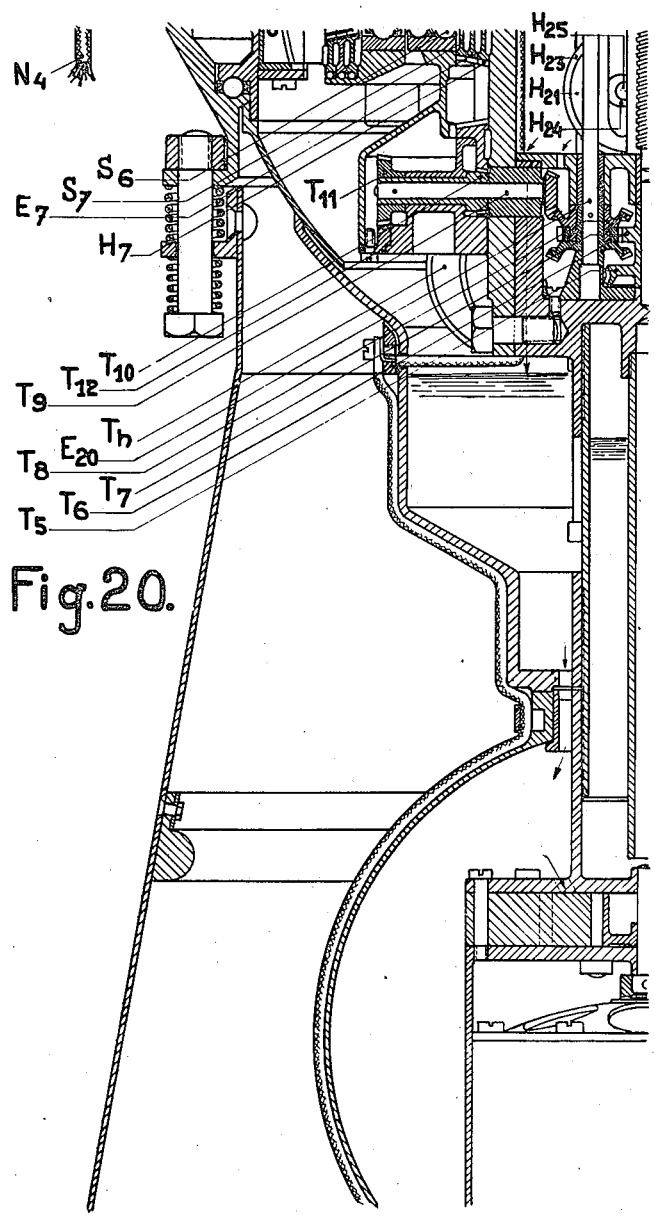
Figure 21:
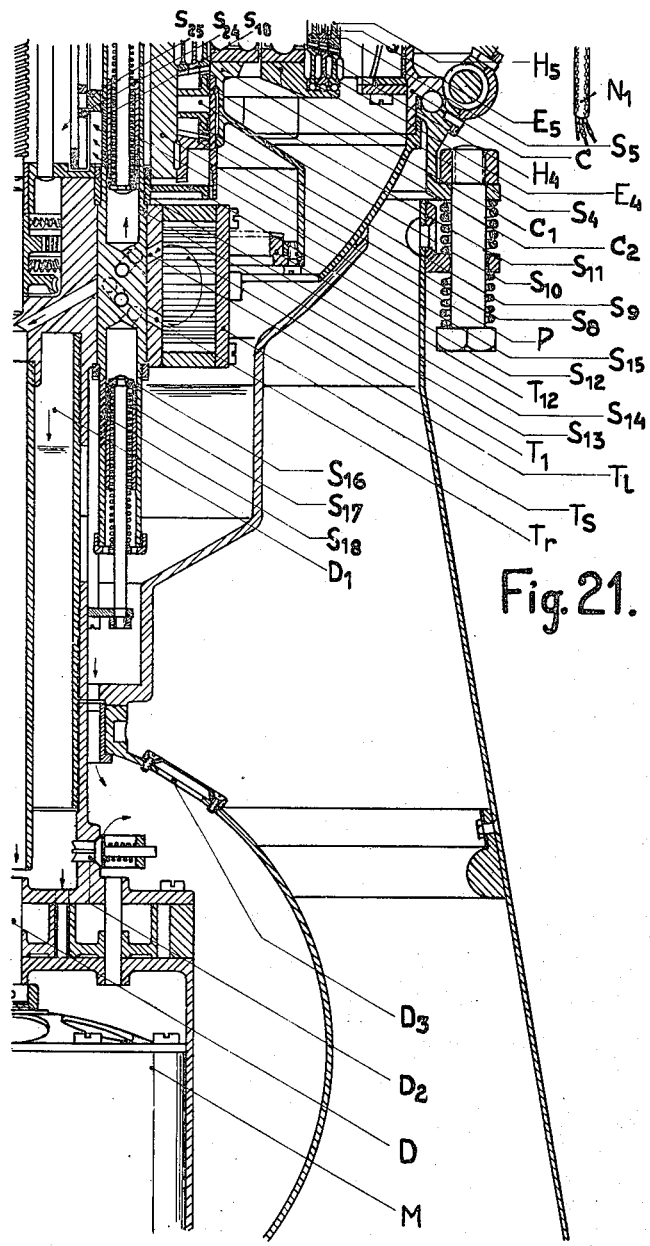
Figure 22:
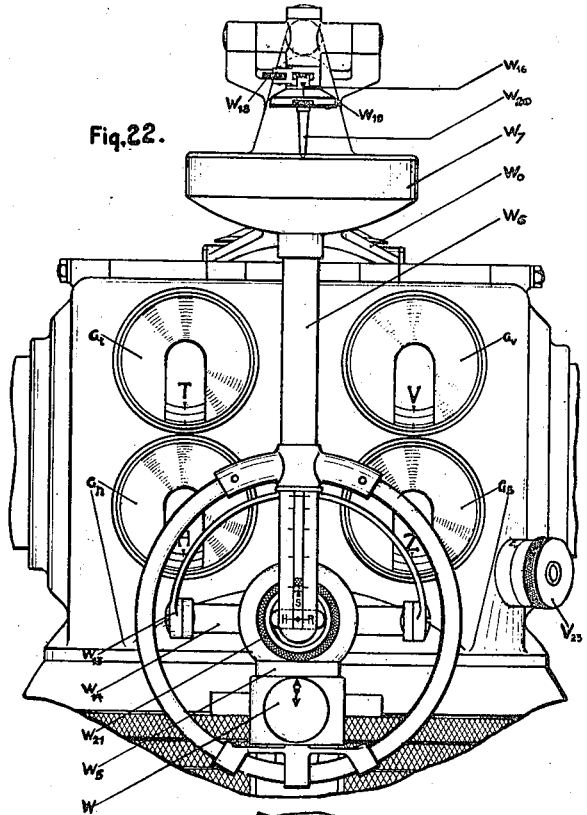
Fig. 22 is a side view of the drift corrector and the indicator.
Figure 23:
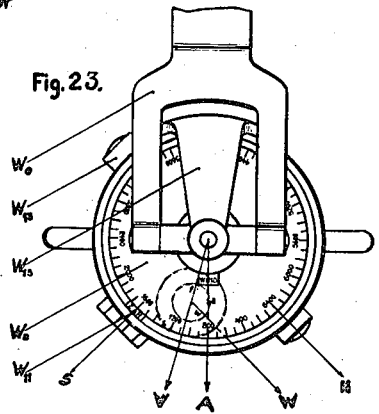
Fig. 23 is a top view of the direction compensator.
Figure 24:
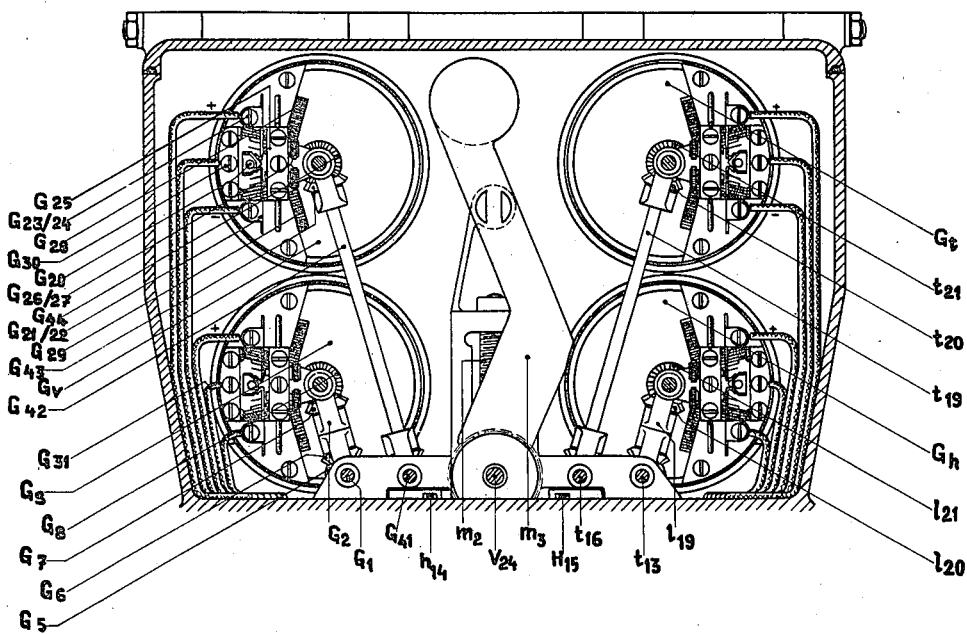
Fig. 24 is a side and part sectional view of the indicator with drive.
Figure 30:
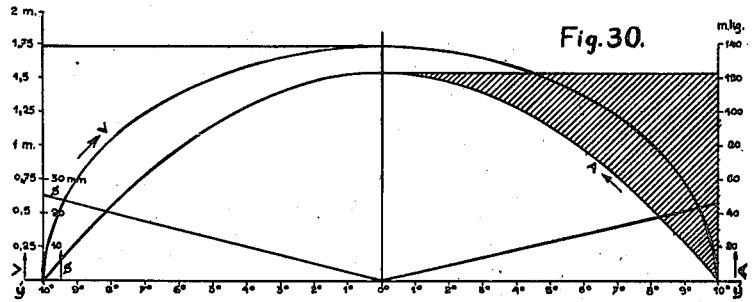
Fig. 30 is a mass pressure diagram of the reverse pendulum.
Figure 32:
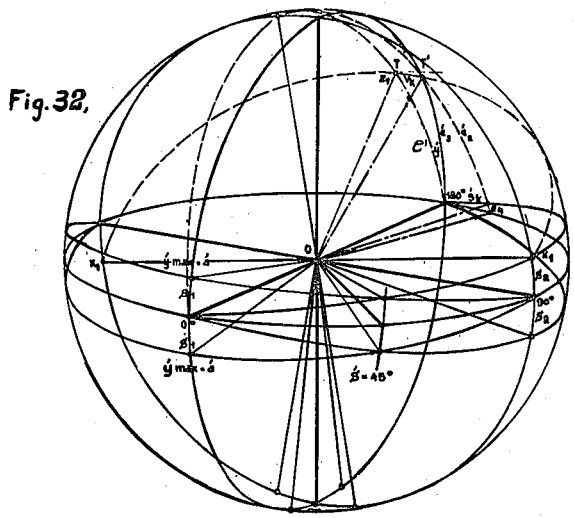
Fig. 32 is a lateral deviation diagram of the carriers in a three axial system of coordinates.
Figure 31:
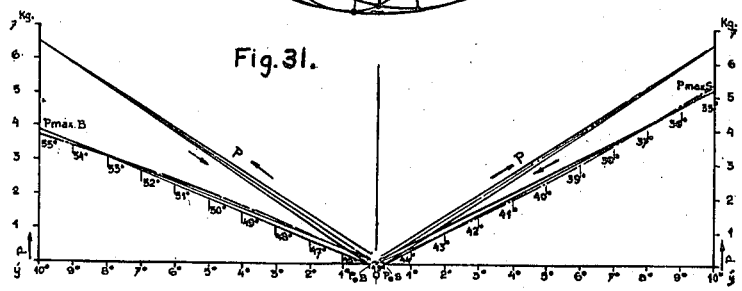
Fig. 31 is a brake pressure diagram of the spring accumulators.
Figure 33:
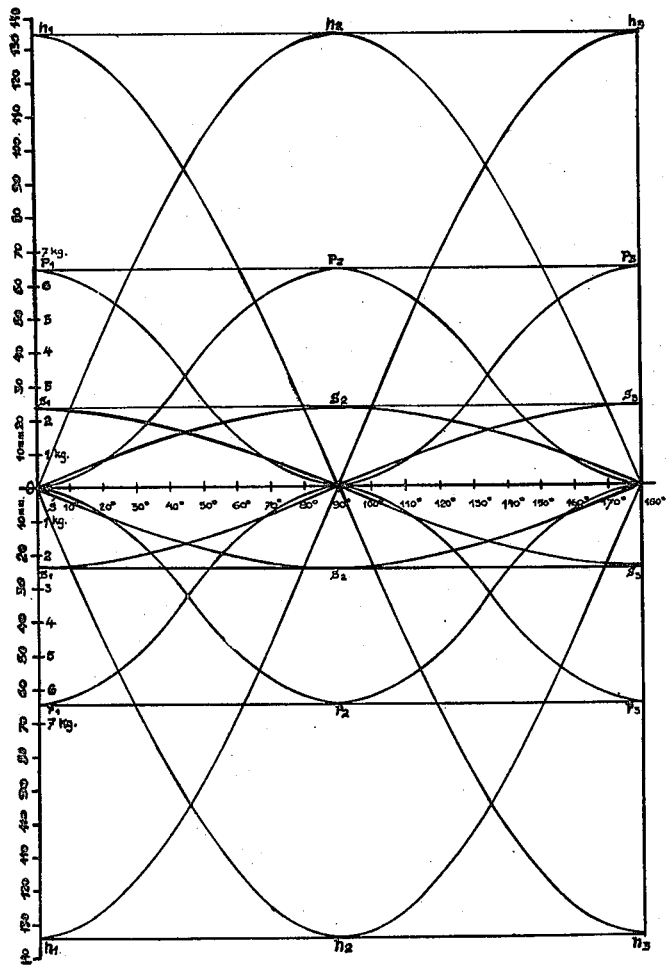
Fig. 33 is a work diagram of the spring accumulators in returning to horizontal position.

As can be seen from Figures 1–7 and 12, the space direction appliance consists of a range meter $E_m$, which can be directed in accordance with the lateral direction, height and distance of the target by means of the three mechanisms $T_s$ $T_n$ $T_e$ shown in Figure 13, which are supplied with fluid under pressure. The fluid pressure is obtained from the gear wheel pump D, driven by the electric motor N, as shown in Figures 14 and 20–24. The whole measuring system is carried by a Cardan link C supported on springs by the pedestal U, and forms with this a reverse pendulum hung in the manner of a seismograph which can compensate for the fluctuations of the carrying body.

Through the pedestal U being firmly mounted on the ship's deck, the bridge, the fighting-top or in the supporting deck (surfaces which are all more or less removed from the meta-centre of the carrying body), the fixing of the Cardan axis of the reverse pendulum, which is desirable, is of course excluded; on the contrary it has to be reckoned that with both lateral and horizontal oscillations of the carrying body it will travel proportionally large distances, and naturally the accelerations also will correspond to the large arcs of oscillation, which are transmitted to the pendulum through the axes.

The fact that the metacentre itself may swing, if the normals to the F-curve do not pass through a point, and the travel and control movements of the carrying body cause all values from O to $P_{max}$, corresponding to the variation in velocity $v$, for $$p.s. = \frac{v^2}{2},$$

and the difference of the $p$-value, that is the force released in the pendulum body P, corresponds accordingly to the difference $$\frac{v^2}{2} max - \frac{v^2}{2} y,$$

and there thus results:

$$P_{1-4}.h_{1-4}.S_{1-4} = \frac{G.e}{g}\left[\frac{v^2}{2} max - \frac{v^2}{2}\bar{y}\right]$$

In addition, however, the mass passes along the path $a.y$, which it traverses, as deduced previously, with the speeds $V_{max}$ to $V_o$; accordingly:

$$P_{1-4}.h_{1-4}.S_{1-4} = \frac{G.e}{g}\left[\left[\frac{V^2}{2} max - \frac{V^2}{2} max\right] - \left[\frac{v^2}{2}\bar{y} - \frac{V^2}{2}\bar{y}\right]\right]$$

In this, however, $$\frac{v^2}{2} max = a.g.[1-\cos \bar{a},] \frac{\bar{v}^2}{2}\bar{y} = a.g[\cos \bar{y} - \cos \bar{a}],$$

it follows that $$P_{1-4}.h_{1-4}.s_{1-4} = G.e.a.[1-\cos \bar{y}]$$

Now, however, the effective length of lever of the pair of trunnions $h_{1-4}$, as well as the brake path $S_{1-4}$, vary in accordance with the placing of the spring accumulators (which are symmetrically arranged between the Cardan links) to the plane of oscillation, for if, for example, the trunnions $h_1 h_3$ are exactly in the plane of oscillation, the lever arm of these $= h. \cos \bar{y}$ and the brake path $= h. \sin \bar{y}$. The trunnions $h_2 h_4$ remain unmoved. If the plane of oscillation turns relatively to the trunnion cross through the angle $\bar{s}$, for example, the pair of trunnions describes circles in the new plane of oscillation with the radii $h.\cos \bar{s}$ and $h. \sin \bar{s}$, consequently the effective length of lever for the trunnions $$h_1 h_3 = h_{max} = h. \cos \bar{y}$$

and for the trunnions $$h_2 h_4 = h_{min} = h. \sin \bar{s}, \cos \bar{y}$$

and corresponding to these the path $$S_{max} = h. \cos \bar{s}. \sin \bar{y},$$

and $$S_{min} = h. \sin \bar{s}. \sin \bar{y}.$$

As, according to this $$P_{1-4} = 2.P_{max} - 2.P_{min}$$

it follows that with the values mentioned:

$$P_{max} - P_{min} = [[P.\cos^2 \bar{s}] + [P.\sin^2 \bar{s}]] = \frac{G.e.s.}{2.h^2} \cdot \frac{1-\cos \bar{y}}{\sin \bar{y}} \cdot \frac{1}{\cos \bar{y}} =$$

This equation, however, is only valid when the space direction appliance can be placed in the vertical middle plane of the carrier, for, if it is brought to one side the acceleration acting on the pendulum body P can be resolved into a vertical force component, which is taken up by the spring supported Cardan ring C and does not appear again, and a horizontal force component. If, for example the space direction appliance is displaced sideways and swung through an angle $\bar{p}$ to the vertical middle plane of the carrying body, only the mass pressure $$\frac{M.V^2}{2} \cos \bar{p} - \bar{y},$$

now acts on the centre of gravity lever arm $e$, and it therefore follows that:

$$(3)\ldots P_{max} + P_{min} = [[P.\cos^2 \bar{s}] + [P.\sin^2 \bar{s}]] = \frac{G.E.a.}{2h^2} tg\frac{\bar{v}}{2} \cdot \frac{\cos \bar{p} - \bar{y}}{\cos \bar{y}}$$

Figure 34:
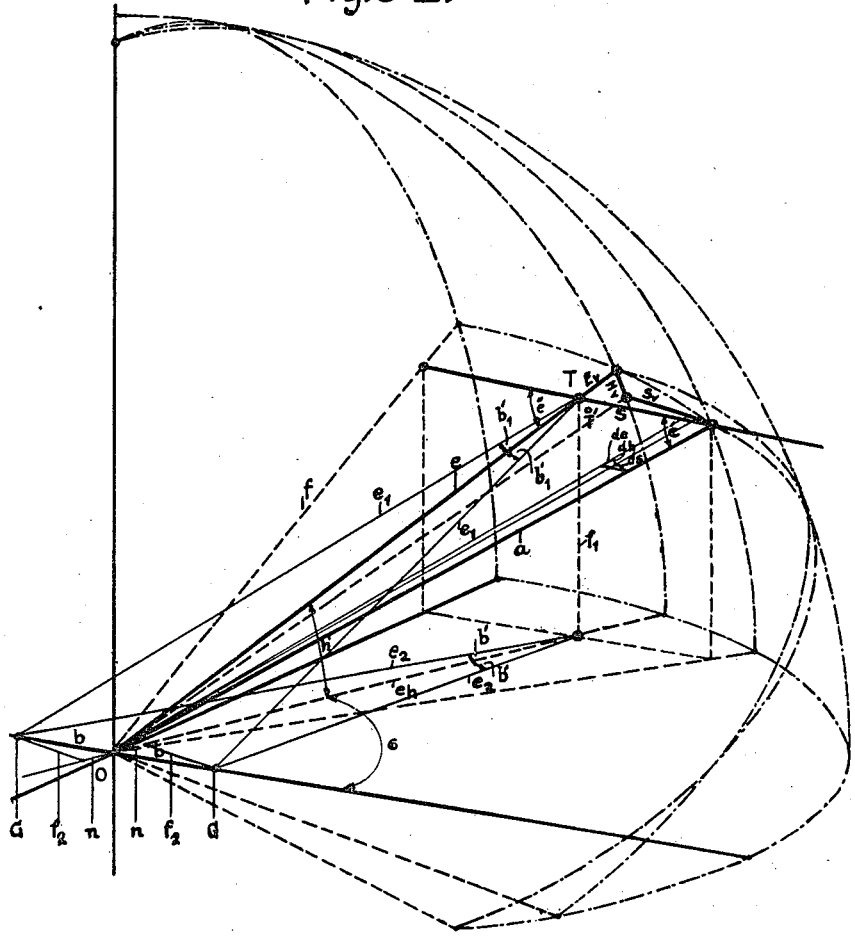
Fig. 34 is a diagram of the target track with retardation triangles.

The simplest case presumes $\bar{s} = 0$, $\bar{p} = 0$, and $P_{max} = 6.5$ kg. For $\bar{s} = 45°$, $h$ and $S$ of both brake pairs are equal, and also $P_{max} = P_{min}$. From Figures 35 and 36 it will be seen how $P_{max}$ and $P_{min}$ are complementary to one another during rotation of the plane of oscillation that is, how they transfer from one pair of trunnions to the other. The rotation of the plane of oscillation about the vertical axis into some side position $\bar{s}$ is therefore without influence, as the action of the four spring accumulators, which can be levelled, remains constant, as must be the case seeing that $\cos^2 - \sin^2 = 1$, and the brake work corresponds at every angle $\bar{s}$ to the mass pressure, as is shown in Figure 34.

It is, however, otherwise with the influence of the angle $\bar{p}$. The mass pressure is altered by this in the ratio $$\frac{\cos}{\cos}\left[\frac{\bar{p}+\bar{y}}{\bar{y}}\right]:\frac{\cos}{\cos}\left[\frac{\bar{p}+\bar{y}}{\bar{y}}\right];$$

as a result of this it is necessary to make the upper lower brake springs unequal to correspond to the difference in pressure set up by the displacement. It will be seen from Fig. 34, that the brake work is again well adapted to the theoretical course of the mass pressure. Suppose that the space direction appliance is placed at one side of the bridge of a ship or airship, or in the supporting deck of a large aircraft, for example, swung through an angle $\bar{p} = 45°$ from the vertical middle plane of the carrying body. With an angle of roll $\bar{y} = 10°$ the horizontal component accordingly forms the angles 55° and 35° with the tangent to the track of the supporting point of pendulum body. These dip points correspond to the mass pressures 3.781 kg. and 5.399 kg.

If the carrier is now dipped towards the side of the space direction appliance, this being for example, the port side, the pressure of the brake springs which is becoming constantly stronger, pushes the brake cylinders from their position through the displacement of a small quantity of fluid, so that at 55° the point $P_{maxB}$ is reached. During the rising period which follows the power which has been supplied to the brake springs now further accelerates the pendulum body, so that the spring accumulators suffer a small loss through the withdrawal of the brake cylinders, which is, however, inconsiderable, so that the pressure does not become zero at the horizontal position of the carrying body but somewhat earlier, i. e. at the point $P_{oB}$. From this point other halves of the brakes commence to work on account of the dipping of the carrying body towards the starboard side and in their turn supply the released energy to their brake springs and force the small quantity of fluid, by a redisplacement, under the brake cylinders which first operated pushing these once more out of their position so that at 35° the point $P_{maxS}$ is reached. With the following return to the horizontal position a double oscillation is completed; shortly before this, however, i. e. at the point $P_{oS}$, the acceleration pressure again ceases (this pressure now being due to the starboard brake springs) and the port brakes commence again from this point to operate in the same way.

It will be seen from the diagram that the spring accumulators vibrate constantly to the pendulum error resulting from the rolling movement, in the range of the largest acceleration force, i. e. in the greatest dip positions, and that the moving of the zero point of the brake pressures in the middle position takes no part in this, as here the accelerating forces are close to zero over a considerable extent. It further follows, from what has already been said, that with carrying vehicles or craft which are slanting or have a list the zero points of the pressure must shift to the new zero plane owing to the displacement possibility, as the brake springs, which are under pressure in the horizontal position, draw the brake cylinders so far towards their side, that the spring tensions become balanced, and the displacement of the spring accumulators is again correct about the horizontal plane.

In this way the reverse pendulum becomes a settled mass permanently in the vertical plane on which the variations of the carrying craft can do nothing further than cause a tilting of the Cardan rings, and in spite of the travel, roll and pitching movements, in spite of the sloping or list and, on account of the spring supports, completely uninfluenced by the rapid variations frequently caused during maneuvering in battle, such for instance as the passing through of the critical speed of the motors or ship's engine, or even caused by the impact of shots, it permits every target from the horizon to the zenith to be sighted at all times without trouble, and the target co-ordinates, "referred to the horizontal plane", to be fixed accurately with its range finder, or by means of this fixing to ascertain the shooting factors correctly with the aid of a mechanical calculating machine.

It may here be remarked that such a corrected reverse pendulum can be considered by itself as a space direction appliance, and brought into combination with some other instruments or apparatus, required in the operation of the ship or airship, instead of using the range finder, and naturally, also, it permits of a correct fixing, with these instruments or apparatus, of the measuring or direction data from a fixed reference plane.

When following a target with the space direction appliance, the reverse pendulum can naturally be no longer influenced in its free oscillations. On this account all moving parts are arranged as symmetrically as possible in order to avoid greater displacements of the centre of gravity, and the operating devices for directing the appliance are displaced through the Cardan trunnions outwards into the Cardan ring C. The operator, when setting the direction, now looks through the fixed ocular O, places his hands on the pedestal head so that the first, second and third fingers lie in the holes of the gripping rings $E_1$ $S_1$ $H_1$, and by turning these adjusts the three mechanisms $T_s$ $T_o$ $T_h$. Presuming that the space direction appliance is ready for use, the objectives of the range finder are now turned on to the target, if the two partial pictures cover one another on the target mark in the ocular, it is easy to hold the target on the sights. That is to say, the direction finder does not follow the target by continual turning of the grip rings, (that would make too heavy claims on him and the movements also would not be sufficiently exact for holding on to the target) he controls only the larger movements from time to time, and the space direction appliance itself moves (with the aid of its mechanical sources of power) the range finder towards the side, distance and height along the path of the target. The ranging proceedings are as follows:

Through the displacement of the grip ring $S_1$, the gear wheels $S_2$ (Figure 12) are turned and transmit the turning through the Cardan axis $c_3$ to the gear wheels $S_3$. These move the gear ring $S_4$ from which the gear wheels $S_5$ take the movement and transmit it through the other Cardan axis $c_4$ to the gear ring $S_7$ by means of the gear wheels $S_6$. Between the gear ring $S_7$ and the gear ring $S_8$ (see Figure 25) the differential pinion $S_9$ runs on the axis $S_{10}$ in the toothed segment $S_{11}$, which as can be seen in Figure 11 meshes with the control segment $S_{12}$ of the sleeve valve $S_{13}$. Every movement of the grip ring $S_1$ to the right or left consequently causes an adjustment of the sleeve valve $S_{13}$ through which the flow channels for right or left running are opened or closed. If, for example, the space direction appliance turns in a clockwise direction, the driving medium (oil, glycerine or the like fluid) which has been forced into the pressure chamber $D_1$ by the gear wheel pump D, flows through the opened sleeve valve in the direction shown by the arrows into the driving mechanism $T_z$ (see Figure 13) and drives the two driving wheels $T_1 T_2$ in the housing in opposite directions. The movement is transmitted through the two axes $T_3 T_4$ by means of the worms to the worm wheel $T_5$, and through the star wheel $T_6$ to the pinion axis $T_9$ by means of the three intermediate wheels $T_7 T_8$ which are arranged 120° from each other and coupled together by a friction coupling, and passed on to the gear wheels $T_{10} T_{11}$. The gear wheels $T_{11}$ now run on the gear rim $T_{12}$ of the inner Cardan ring $c_2$ and consequently turn the whole reverse pendulum on the spherical orbit $c_5$ about its vertical axis.

The gear wheels $T_{10}$, however, which mesh with the gear ring $S_8$ give to this, when the reverse pendulum is turned, double the turning velocity, so that the gear segment $S_{11}$, which is driven through the differential pinion $S_9$, must traverse the same angular path as the reverse pendulum. A displacement of the sleeve valve $S_{13}$ cannot in itself result, therefore from a turning of the reverse pendulum, but any desired lateral velocity can be obtained through a corresponding movement of the grip ring, thus causing a more or less strong throttling of the sleeve valve channel $T_r$, or by the passing of the corresponding quantity of driving medium. The quantity of driving medium passing through the mechanism $T_s$ when following a target sideway, consequently indicates the comparative amount of the momentary displacement of the target laterally, which renders possible the automatic ascertainment of the lateral retardation $S_v$ for the relative travel of the target. For this purpose the driving medium is intercepted after passing through the drive-mechanism in the sleeve valve $S_{13}$, and, under the pressure of the backward flowing fluid raises the piston $S_{14}$ to such a height that the fine discharge holes $S_{18}$ arranged in the cylinder walls are so far uncovered that the quantity of driving medium flowing in can be discharged in the same time. Should the quantity of fluid vary, the piston correspondingly rises or falls, should the lateral movement cease, i. e. no more fluid comes under the piston, the spring $S_{15}$ arranged above the piston, forces this back into the zero position, and if the target now moves towards the other side, the mechanism works in a corresponding manner through turning the grip ring $S_1$, whereby the piston $S_{16}$ and the springs $S_{17}$ come into action.

Every lateral velocity, either in a clockwise direction or otherwise, corresponds accordingly to a certain piston position, and as the pistons are coupled through the double connecting rods $S_{19}$, the position of the rod shows at all times the momentary lateral movement of the target being followed.

In exactly the same way, by turning the grip rings $E_1 H_1$ the movements are transmitted from $E_1$ to $E_7$ and from $H_{-1}$ to $H_7$ and to the differential pinions $E_9 H_9$ (see Figure 11) and the sleeve valves $E_{13} H_{13}$ of the mechanisms $T_e T_h$ are adjusted through the gear segments $E_{11} H_{11}$. Here also the driving medium now passes in the manner previously described through the mechanism, so that through the double connecting rods $E_{19} H_{19}$ the momentary movements of the target being followed are given both upwards and in distance by the space direction appliance.

It is clear that the pressure pump D (see Figure 14) must be chosen sufficiently large to supply at all times a quantity of the driving medium at highest pressure, even when the sleeve valves are fully open (i. e. greatest relative velocity between the target and the space direction appliance) to supply all three mechanisms. When the sleeve valves are throttled, that portion of the driving medium which is not required flows back directly into the pendulum bob through the safety valve $D_2$. The permanent flow can be controlled through the sight hole $D_3$.

From the axis $T_3$ (see Figure 13) the drive is now also taken through the pinions $T_{13} T_{14}$ to the lateral direction axis $S_{20}$ (see Figures 1-7), which gives the lateral direction which is from time to time uncorrected to the adding mechanism, in a manner which is more closely described further on; in the same way the movement of the mechanisms $T_e T_h$ is transmitted to the distance-direction axis $E_{20}$ and the height direction axis $H_{20}$, from the driving wheels $T_{15} T_{16}$ through the axis $T_{17} T_{18}$ and the pinions $T_{19} T_{20}$. The three direction axis $S_{20} E_{20} H_{20}$ which are driven from the mechanisms, thus run in the hollow shaft of the pendulum body P and constantly reproduce the three polar co-ordinates $s\ e\ h$ in the space direction appliance, and in addition, through the position of the double connecting rods $S_{19} E_{19} H_{19}$ the instantaneous vectors $s_v e_v h_v$ are also known. If now the path of the target is considered which is estimated by the space direction appliance, and in whose prolongation for every second the probable striking point can be ascertained from the six factors given, then referring to Figure 37 it follows that if $a$—$e$—$s$ denotes the allowance triangle and $ds$ the path traversed by the target in the time $dt$, then:

$$s^2 = a^2 \times e^2 - 2a.e \cos \bar{s}$$

By differentiating, $$s.ds = a.e \sin \bar{s}.\bar{ds}$$

or for $$e. \sin \bar{a} - s. \sin \bar{e}, ds - a. \sin \bar{e}. \bar{ds}.$$

If now from the space direction appliance the perpendicular $f$ is dropped to the target path, then $\dfrac{f}{a}$ becomes the perpendicular sine and consequently $\bar{ds}$ alters in proportion to the perpendicular sine; that is, the standard instantaneous vectors for the determination of $\bar{ds}$ must first be corrected if they are multiplied by the flight-time of the projectile to the probable point of impact T, which will show the correct allowances. If it is not wished to insert the corrections, if for example with an approaching target the allowance point $\overline{T}$ should be "short-deep-right" from the target, the variation in the perpendicular sine $s_v$ $h_v$ must in this case be correspondingly increased, while the variation in the perpendicular cosine must be correspondingly reduced. This takes place in the allowance mechanism, whose method of working is schematically indicated in Figure 38.

As will be seen from this the ordinates show the shooting distances, or the projectile flight times which determine these, for a certain type of gun; the abscissæ indicates the path of the target which will be traversed during the flight time of the projectile with a target velocity of 100, 200, 300 km./hr. Assuming now that the target is approaching the space direction appliance with a velocity of 200 km. per hour and that the probable point of impact lies at a distance of 5000 m., the shot must leave the muzzle of the gun (apart from other influences) at the second in which the target passes the periphery of the orbit in $Z_k$ about T. If now a straight line is drawn at 45° to the $y$-axis, this indicates at once as will be seen, the flight time and the estimated distance for every point of the curve, for through it the length of the abscissæ to the ordinates is at all time fixed.

And as, instead of the abscissæ chosen, any others may be inserted, from which the corresponding flight time and estimated distance can be determined, and further, for the adjustment of the abscissæ i. e., for the sum of the instantaneous vectors which follow one another during the flight period, the straight line itself which runs at 45° can be used, whereby the corrections of the instantaneous vectors can easily be obtained through variation of these straight lines from their normal position (as indicated by the dotted line) the diagram shows the simplest manner for the mechanical ascertaining of the allowances.

In the allowance mechanism (see Figures 10 and 20–24) the curves for the target travel are rectified by choosing uniform divisions of the flight period. The axis of rotation $S_0E_0H_0$ correspond to the commencement of the co-ordinates of the diagram in Figure 38, and about these oscillate the slotted allowance levers $S_{21}E_{21}H_{21}$ with their right and left hand gear segments, and transmit through these the oscillating movements of the allowance levers to the differential traversers $S_{22}E_{22}H_{22}$. The differential traversers in their turn work on a tappet in the fork lever of the vector discs $S_{23}E_{23}H_{23}$, which is carried on the lower circle of the allowance lever on which it can revolve so that a swinging of $S_{21}$ causes a rotation $E_{23}$ and $H_{23}$ and further, $E_{21}$ in exactly the same way $S_{23}$ and $H_{23}$, while $H_{21}$ affects $S_{23}$ and $E_{23}$ corresponding to the variation of the perpendicular sine.

If now, while following the target, the guiding rollers $S_{24}E_{24}H_{24}$, which are carried on trunnions fixed to the vector bridges $S_{25}E_{25}H_{25}$ connected by the double connecting rods (see Figure 11) slide in the slots of the vector discs, which are arranged diagonally to the direction of movement, they press the allowance levers out of their zero positions and thus automatically alter the position of the vector disc slots in the manner described above, i. e. they correct the instantaneous vectors, and it is now possible to take the S—E—H allowance for the flight period in question in every allowance element on the corresponding range distance from $S_0E_0H_0$ on the allowance lever in the length of the abscissæ; a function which results from the flight period discs $F_2$ sliding up and down by turning the flight period spindle $F_1$. Its three sliding surfaces which are turned towards the allowance levers, have cross shaped slots, in which the allowance-slides $F_3$ are held, these latter being provided with a rack. Each allowance-slide engages in the longitudinal slot of its allowance lever by means of the guide rollers $F_4$ carried on the slide trunnions, and takes part in its lateral movement from the zero position, and conveys the allowance which is taken with it on its allowance axis, by means of its rack and the allowance pinion $F_5$ meshing with it. The turning of the allowance pinion is now added to the turning of the range direction axis $E_{20}$ through differential drives, as will be demonstrated later, the sum of the two range valves is conveyed to the shooting table corrector A, from which the flight period spindle $F_1$ takes its drive, and this brings the flight period valve $F_2$ into the correct flight period position.

The path of the target, or the expected change of position of the target relative to the space direction appliance during the flight of the projectile, is now determined by turning the allowance axes $S_v$ $E_v$ $H_v$ equivalent to the variation in the lateral direction, angle of elevation and range; the functions of the allowance mechanism are thereby fulfilled.

The next problem of the space direction appliance is that of grasping and adjusting the errors which occur as a result of the tilting of the carrier through the sloping position of the pivot axis of the gun during shooting. For this purpose the heeling corrector K is provided (see Figures 9 and 20–24). It consists of a Cardan support K $k_1$ $k_2$ $k_3$, which can be turned around the vertical axis of the pendulum body P and on whose dial $k_3$ the rolling and pitching movement of the carrying craft are transmitted by means of the slide rollers $c_6$ from the outer Cardan ring C or from its protecting cap $C_1$. When tilting about the Cardan axis $k_4$ the angle of roll, for example, passes through the gear segment $k_5$, which is at right angles to $k_4$, to the pinion axis $k_6$, and from here it goes through the pinion $k_7$ and the toothed ring $k_8$ to the pinion axis $k_9$ and the toothed ring $k_{10}$. In the case of tilting about the Cardan axis $k_{11}$ the pitching movement passes through the gear segment $k_{12}$, which is at right angles to $k_{11}$, to the pinion axes $k_{13}$ and the toothed ring $k_{14}$.

If now, the crossed axes $k_4$ $k_{11}$ remain constantly parallel, or at right angles to the base of the range finder which is directed on to the target, the effect of the tilting of the axes on the target direction can now be determined from the angular values obtained; for ascertaining the shooting factors, however, the slope of the pivot axis of the gun when directed, or the slope position of the trunnion axis during shooting, come into question, and it is consequently necessary to place the cardan axis $k_{11}$ parallel to the trunnion axis of the gun when pointed. For this reason the heeling corrector K is arranged so that it can turn on the axis of the pendulum body P, and is previously turned into the shooting direction by the lateral allowance axis $S_v$. To this end the allowance axis $S_v$ imparts its turning movement through the pinion $V_1$ to the lower axis of the differential $V_2$, and through the traverse of the differential to the heeling corrector X. This accordingly swings forward into the shooting direction so that now the two gear rings $k_{10}$ $k_{14}$ give the required angular value for the sloping of the trunnions and the inclination to the horizontal plane; the improvement for the lateral direction and height is now to be determined.

Figure 35:
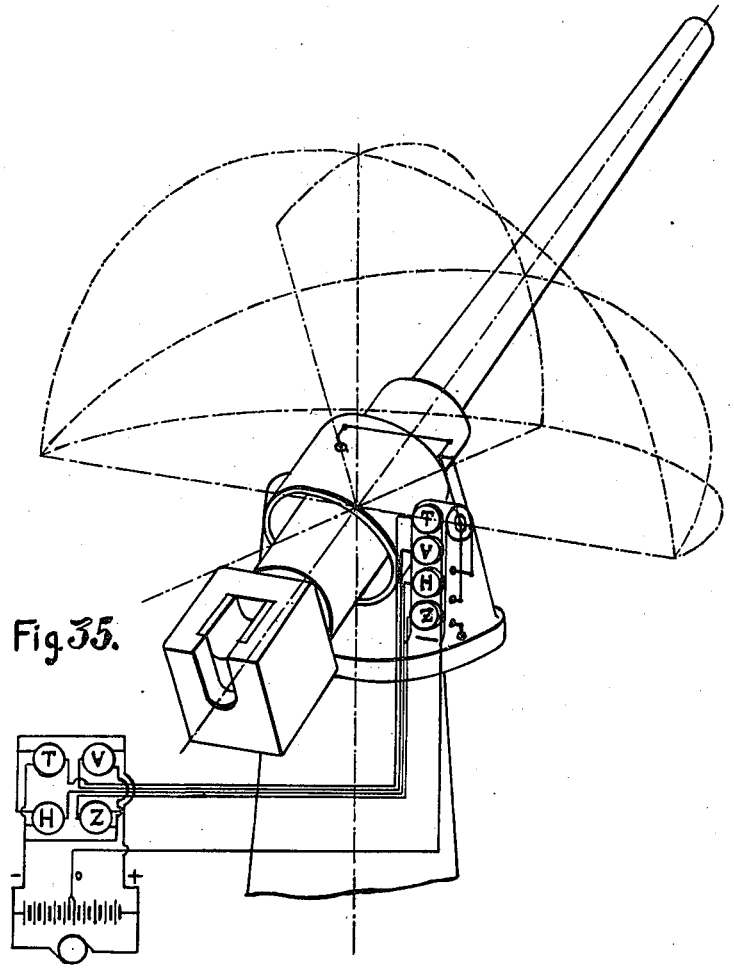
Fig. 35 is a diagram for the transfer of the direction elements to the gun.

For tri-axial guns, from the angle of roll $\bar{y}$ and the gun elevation $\bar{e}$, it is possible to obtain the lateral allowance $v_k$ or the lateral swing about the third axis perpendicular to the plane of elevation, from the equation:

(5) $\mathrm{tg}\, v_k = \sin e \cdot \mathrm{tg}\, y$ (see Figure 35)

For bi-axial guns, the lateral turning $s_k$ about the pivot axis is obtained from the $v_k$ ascertained by the above formulæ, and from the gun elevation $e$ as follows:

(6) $\mathrm{ctg}\, s_k = \sin/20° - e/ \cdot \mathrm{ctg}\, v_k - \mathrm{ctg}\, e \cdot \mathrm{ctg}\, y$
$\mathrm{tg}\, s_k = \mathrm{tg}\, e \cdot \mathrm{tg}\, y$.

In the space direction appliance the base of a triangle is also used for each of the two values $v_k$ and $s_k$, which are to be determined, the apex angle of the triangle corresponding to the $y$-function and the height to the sin $e$-function, or the tg $e$-function. The method of working of the elements can be seen in Figures 1–7 and 8.

Both the movement of the heeling corrector K and the turning of the gear ring $k_{10}$ about the vertical pendulum axis, are taken from the differential drives $k_{16}$ $k_{17}$, which are carried on the cross disc $k_{15}$ and in such a way that a uniform turning movement of both cannot produce any turning of the upwards pointing differential axes, as the gearing is so chosen that the differential housings turn half as quickly as the downward pointing differential axes, so that the upper axes remain fixed. If, however, the gear ring $k_{10}$ in K moves on account of rolling or pitching of the carrying craft, the movement is immediately transmitted to the upper differential axes and these now adjust the double lever $k_{18}$ carried beneath the cross disc $k_{15}$ in opposite direction to the cross disc about the estimated heeling angle. The shank of the double lever $k_{18}$ is provided with longitudinal slots similarly to the allowance lever in which work the slide rollers $k_{20}$, which are carried on the trunnions of the rack slots $k_{19}$, so that when the double lever $k_{18}$ is rotated, the rack slots $k_{19}$ move in the cross grooves of the elevation valves $k_{21}$ $k_{22}$ to a greater or less extent, according to the distance of these valves from the point of rotation. In order to be able to adjust the distance of the elevation valves from the centre of rotation of the lever arms in accordance with the equation, the curved disc $k_{23}$ is arranged above the cross disc $k_{15}$; the two $e$-functions in the polar co-ordinates, are represented in this by curved slots.

The curved disc $k_{23}$ is now adjusted from the shooting table corrector A to the total angle of elevation $a$, whereby the elevation valves slide through the curved slots into the sin $e$ or tg.$e$ position, so that now the movements caused by the rack slots $k_{19}$, together with the turning movement of the pinion axes $k_{24}$ $K_{25}$ comply with the Equations 5 and 6. As, however, by drawing the corrector in the lateral direction, the trunnion axis is advanced into a new position, which requires another heeling angle $y$, before the shooting factors can be obtained the corrector must again be led back to the heeling corrector.

For determining the lateral direction for bi-axial guns the movement of the pinion axis $k_{25}$, which gives the value of the Equation 6, is led through the gear segment $k_{27}$ into the traverse of the differential $V_3$; in addition the weakening of the rifling is added from the shooting table corrector by the drive of the lower axis of the differential $V_3$, which passes upwards, and both movements are given to the heeling corrector K from the upper axis of the differential $V_3$, through the upper axis of the differential $V_2$ and through the traverse of this differential. There now comes the question of inserting a similar lateral correction for the drift of the projectile which results from the action of the wind and the carrying of the projectile in the travel direction of the carrying body, for this the heeling corrector K must likewise be brought round also. It may here be anticipated that this correction is also taken over the axis, as explained in the next paragraph, and is therefore already contained in the heeling corrector.

Its Cardan axes $k_{11}$ thus stand parallel to the trunnion axis of the gun when aimed, and the heeling angle which is obtained from it in this position and added to the correction to base, corresponds to the slanting position of the trunnion axis when shooting; thus the movement obtained through the pinion axis $k_{25}$ corresponds to the correction angle about which the gun must swing laterally to eliminate the range error set up by the heeling.

The third problem of the space direction appliance consists now, as already mentioned, in the ascertaining and elimination of the drift which the projectile suffers on account of the wind and, due to its inertia, on account of the movement of the carrying craft. The drift corrector W offers suitable handles for this, at least as far as ascertaining the correction is concerned; for as both influences affect the removal of the flight track of the projectile in a similar way to the tilting of the pivot axis caused by the heeling, the drift corrector can be joined with the heeling corrector, as stated above, by simply inserting an artificial heeling. It is obvious that when shooting vertically the drift can be compensated by tilting the pivot axis out of the drift direction, as the error will then be at once removed through a corresponding modification of the tilting of the outer Cardan ring. When the flight track is dropped to the horizontal, the drift does not alter so long as shooting is in a direction diagonal to the drift direction, but it does alter if there is any alteration between the shooting and drift directions; and here also, the alteration of the drift follows a sine function. If, therefore, an eccentric device is used which passes on its eccentricity (chosen to correspond to the drift) to the sine piece, both in the vertical and horizontal direction, this will give correctly the proper course of the drift of the projectile.

In the space direction appliance the upper protection cap $C_1$ (see Figures 9 and 20–24) is capable of rotation on the Cardan ring C for the purpose of adjusting the drift direction. In its extension W, which forms the drift indicator, the drift lever $W_1$ swings, which engages with the globe trunnion $W_2$ in the slide roller container. The slide roller container is carried by and can turn on the slide roller axis attached to the protection cap $C_1$ at right angles to the point of engagement of the drift lever $W_1$. Every displacement of the drift lever $W_1$ thus tilts the slide roller container $W_3$, i. e., places it in the artificial heeling position, so that the plate dial $k_3$ takes up not only the heeling angle $y$, but also the additional angle for compensating the drift. This latter is now directed according to the strength of the wind and the travel speed, and according to the angle at which the shot will be fired relative to the drift direction. The shooting indicator $W_5$ is provided for determining this value; it is carried in the drift indicator, and forms with its parallelogram of rods $W_6 W_8$ the connection between the drift indicator W and the pendulum body P. Owing to this arrangement the range rod $W_6$ remains always vertical as does also the pendulum axis, and consequently gives the possibility of inserting the directions, in a longitudinal plane, of travel, wind, drift and shooting. For this purpose the range compass $W_7$ is arranged above the range rod $W_6$. It consists of a housing filled with glycerine, which is closed on top by a glass plate $W_8$. Inside, and resting on the filling fluid, is the float with range dial $W_9$, which is held with its zero mark pointing constantly northwards by the magnet $W_{10}$.

Between the range dial $W_9$ and the wall of the housing runs the pointer $W_{11}$, which is coupled to the shooting indicator $W_5$ by means of the rod $W_{12}$ and the forked links $W_{13}$ $W_{14}$. At the back of the compass $W_7$ is attached the hinge fork $W_{15}$; the travel valve $W_{16}$ is carried in this above the centre of the housing, and in addition the wind valve $W_{17}$ is attached underneath, both these valves being capable of rotation. These travel and wind valves are provided above with a velocity scale, and can be moved from their zero position by operation of the pinion wheels $W_{18}$ $W_{19}$. A velocity scale is also provided on the glass plate $W_8$, along a boundary line running parallel to the drift indicator, on which the strength of the drift can be read off. If, now, the travel valve $W_{16}$ is adjusted to the corresponding travel speed and travel direction, and the wind valve $W_{17}$ on its head, which is adjusted to the strength of the wind, is turned in the direction of the wind, and if further the boundary line on the glass plate $W_8$ is brought under the wind valve marked $W_{20}$, by turning the drift indicator W, then the strength and direction of the drift is given as the resultant $a$ of $f$ and $w$, as is shown by the dotted line in Figure 25. The drift strength ascertained has now to be inserted on the shooting indicator $W_5$. If the knurled grip ring $W_{21}$ is now turned until the value obtained above is on the scale $W_{22}$, the trunnion $W_{23}$ is thereby pushed from the centre position of the globe by a certain amount, and simultaneously the eccentric bar, which is provided with diagonal grooves, is so moved that the eccentric $W_{25}$ exhibits constantly the same eccentricity as does the trunnion $W_{23}$ to the centre of the globe. The rod $W_{26}$ is also joined to the trunnion $W_{23}$, and through it the drift lever $W_1$.

Assuming now that the shooting indicator $W_5$ stands in the drift direction, a swinging in the vertical direction gives at all times the sine component of the inserted eccentricity to the slide roller container $W_3$, through the drift lever $W_1$; when swinging in a horizontal direction the movement is supplemented by the eccentric $W_{25}$, which runs on the fixed geared ring $W_{28}$ when the globe with its geared ring $W_{27}$ is turned, so that the whole shooting indicator rises or falls on the drift indicator following the course of the sine function. Thus, if the shooting indicator $W_5$ is placed diagonally to the drift direction, the whole eccentricity introduced is at all times effective, and is the same when shooting at any angle of elevation; for if the shooting indicator is swung upwards while in this position, the eccentric lift is passed on automatically to the lift of the trunnion $W_{23}$. The same naturally occurs in every other lateral position, so that the corresponding correction component is of necessity inserted according to the direction of the tip of the shooting indicator to the drift direction. Thus, if the tip of the shooting indicator is adjusted laterally towards the range dial by means of the pointer $W_{11}$ and upwards towards the elevation scale on the link for $W_{13}$, the drift of the projectile is exactly excluded and the heeling corrector and drift corrector have fulfilled their functions.

In this way all factors which can influence the lateral direction when shooting with bi-axial guns have been provided for with the space direction appliance, and the traverse of the differential $V_2$ contains all the corrections through which the gun must be turned from the momentary target position given by the lateral range axis $S_{20}$.

The movement of the traverse now goes from $V_2$, through a transmission pinion free to turn on $V_4$ to the traverse of the differential $V_6$, whose lower axis partakes of the movement of the lateral range axis $S_{20}$ led to it through $V_5$, and now the upper axis of the differential gives the same value of lateral range, through the pinion axes $G_1$ $G_2$, to the shooting table corrector A and to the Giver $G_s$.

When it is not a question of shooting with bi-axial guns, the connection ring $k_{30}$ is tipped by means of the disconnector $k_{29}$, and this sets free the upper axis of the differential $V_3$ and fixes the upper axis of the differential $V_2$; the movement of the pinion axis $k_{25}$ then runs idly in the differential $V_3$, and the space direction appliance is at once ready for use with tri-axial guns.

The other correction element, which works on the pinion axis $k_{24}$, now commences to function. Here also the movements for heeling, wind and travel drift are led from $V_4$ on to the traverse through $k_{26}$ in the same way as previously described, and twist deviation and parallax correction are also added by driving the lower axis from $V_4$. The movement of the upper axis of the differential $V_4$ produces the allowance for the swinging of the barrel about the third axis, as it is also led through the pinion axes $G_{11}$ $G_{12}$ on the shooting table corrector A and on to the Giver $G_v$.

The corrections for heeling, wind drift, travel drift, twist and parallax are thus adjusted through the third axis, which requires an extent of swing of about 25° to either side.

Of course, the allowance for the target travel is to be included in the extent of swing of the third axis; the heeling corrector must then be fixed in the target direction and the movement must be led from the lateral allowance element $S_v$ through the differential to the indicator $G_v$ after calculation. Instead of calculating the allowances for the third axis, which have already been determined in the horizontal plane, it would, of course, be possible to swing the range finder about a third axis. Quite apart, however, from the consideration that this axis would then be perpendicular to the plane of the target while the gun barrel swings in the elevation plane and thus does not correspond with the value of the angle, the swinging of the range finder about the third axis would postulate still another organ of movement to be operated by the range controller. This would, however, very much complicate the extension and use of the range finding device or the space direction appliance, for according to the results of experimental psychology (see W. Wundt and also Schultz, "Experimental Psychology and Pedagogy") a man can give his attention to, at the most, 6 separate units. If, therefore, the range controller gives his close attention to observing two partial images and the target mark, and keeps it covered by the operation of three organs of movement, the sense-constant "6" is complete. For any further functions, therefore a second range controller must be introduced to supplement the other. As, however, each range controller, even with the best instruction, makes individual range errors, which, although they could be eliminated with one range controller, cannot be eliminated with two, the following unfavourable grouping results for the range accuracy:

R₁ follows the target accurately.    R₂ follows the target accurately
" " " "    ranges incorrectly
ranges incorrectly    follows the target accurately
" "    ranges incorrectly thus only one favourable out of four possible cases, consequently the probabilities are:

$$W = \frac{g}{n} = \tfrac{1}{2} \cdot \tfrac{1}{2} = \frac{1}{4}$$

The proportions naturally appear very much worse if the functions, which have to be decided in order to ascertain the range elements, are separated from one another, as is most usual, and if still more operators are introduced into the ranging process; the probability of good shooting sinks at least as the square. On this account it has been sought in the present invention to make the fire control dependent on one range controller only; and on this ground the preference has been given to the bi-axial arrangement as the best solution, with which one can, in the truest sense of the word, "come well on the target."

On account of the various lateral corrections which were necessary, only one error is originated in the height direction; for, if the gun barrel swings about the third axis, which stands perpendicularly to the plane of elevation, the straight line OT (see Figure 35), which is identical with the bore axis, slides on the plane $x_1-z_1-x_1$, to $T'$, so that from $e_1'$ and $v_k'$ is obtained the elevation $e_3'$.

It becomes:

(7) $\cos e_3' = \cos e_1' \cdot \cos v_k'$

With bi-axial guns the axis of the bore describes a spherical envelope when swung about the pivot axis, and therefore $e_2' = e_1'$, and this gives from $e_1'$ or $e_2'$ and $s_k'$ the new elevation:

(8) $\cos e_3' = \cos e_1' \cdot \cos s_k'$

For excluding the height error, the correction elements $h_{10}h_{11}$ are placed in the foregoing angles of the cross disc $k_{15}$. They each consist of a segment lever which run in the gear segment $k_{26}$ and $k_{27}$ respectively, and thus partake of the $v_k$ valve and $s_k$ value. The segment levers $h_{10}h_{11}$ are provided on top with a slipper guide, in which the slipper trunnions $h_{12}h_{13}$ slide, and are guided by the cover disc $k_{23}$ into the corresponding elevation positions. The links $h_{14}h_{15}$ are carried above the cover disc $k_{23}$ on the slipper trunnions $h_{12}h_{13}$, these links now transmitting the corrections given by the two sliding movements of the slippers to the upper axes of the double differentials $h_{20}h_{21}$.

The double differentials $h_{20}h_{21}$ further receive the rotation of the heeling corrector K, through their lower traversers, and the rotation of the gear ring $k_{14}$ through their lower axes, these rotations corresponding to the pitching or rolling angle in the shooting direction. The intermediate axes of the double differentials accordingly give the slope of the barrel, which results from the heeling, and also the artificial heeling, i. e. the height improvement inserted for the purpose of excluding the drift. Through the upper axes also by means of the links $h_{14}h_{15}$ as just described, the height errors originating from the lateral corrections are included, so that now the upper traverse of the double differential $h_{20}$ gives the height corrections for 3-axial guns, and the upper traverse of the double differential $h_{21}$ the height corrections for 2-axial guns. According now as to whether the space direction appliance is being used for two or 3 axial guns, the corresponding double differential is inserted by means of the reverser $k_{29}$, by tilting the connection ring $k_{30}$, as already mentioned for the lateral direction, which at the same time makes the other dead.

The combining of the various values for the height, in an adding mechanism, now follows in a similar manner to that described for the lateral direction. The allowance for the travel of the target during the flight time of the projectile is transmitted from the height allowance axis $H_v$ through the pinion $V_7$ to the lower axis of the differential $V_8$; the upper traverse of the double differential $h_{20}$ or $h_{21}$ works on the upper axis of $V_8$, and now the traverse gives both movements from $V_8$ to the traverse of the differential $V_9$, through the transmission pinion which is carried by and can rotate freely on $k_{17}$. The height direction is led from $H_{20}$ into the lower axis of this differential ($V_9$) through the pinion $V_{10}$, so that now the upper axis of the differential $V_9$ reproduces the value of the angular position of the probable point of impact, which is transmitted to the shooting table corrector A through the gear wheels $l_1l_2$ and the axis $l_3$ and through the parallax corrector J, and is set up for determining the extra angle.

Further, the movement of the height range axis $H_{20}$ is transmitted from the upward extended lower axis of the differential $V_9$ through the pinion $V_{11}V_{12}$ to the worm $V_{13}$. The worm works in the worm wheel segment $V_{14}$ and consequently turns the range finder upwards on to the target and thus reproduces permanently the height polar co-ordinates $h$ in the space direction appliance.

Finally, the estimation of the distance is necessary, which as will be seen from Figures 15–19 and 25, is determined by turning the measuring key $m_8$ in the range finder $E_m$. The micrometer spindle $m_2$ is turned by means of the gear $m_6m_7$ away from the range axis $E_{20}$, whose movement is led to the upward extended lower axis of the differential $V_{16}$, through the pinion $V_{15}$.

In this way the spindle nut $m_5$ slides upwards, presses the measuring segment $m_3$ from the zero point by means of the guiding rollers $m_4$, and thus turns the measuring key $m_8$, which engages in the slotted axis shoulder of the measuring segment, so that the two partial images of the objectives cover one another as a result of the diversion of the pencils of light rays, and by a suitable speed of rotation of $E_{20}$ or $T_e$ corresponding to the relative movement of the target, are permanently held covering one another. Consequently the distance is determined as the known third polar coordinate, and at the same time also the instantaneous vector $e_v$ is permanently given. The movement is now further taken from the distance allowance axis $E_v$, through the pinion $V_{19}$ to the lower axis of the differential $V_{20}$. The upper axis is displaced outwards by the bevel wheels $V_{21}V_{22}$, so that the shooting controller can take up a distance correction in accordance with the shooting ratios for the time being, by turning the hand wheel $V_{23}$. The movement of the traverse of the differential $V_{20}$ is taken to the traverse of the differential $V_{16}$, through the intermediate wheel which is free to turn above $h_{20}$, and now the upper axis of $V_{16}$ reproduces through its turning the shooting distance to the probable point of impact; it is also taken to the shooting table corrector A through the cone wheels $V_{17}V_{18}$ and the axis $V_{24}$.

The spatial position from T to the gun or battery station is now to be determined according to the co-ordinates settled for the space direction appliance; the extra angle, the twist and the flight time or tempering are then to be decided in accordance with the co-ordinate transformation from the ascertained shooting distance and the resulting gun position angle, as a result of which allowance can be made for the variations from the shooting table values caused by the $v_0$-alteration due to travel and wind and also caused by the variable atmospheric pressure and the result of shooting on the gun barrel, this allowance being effected by corresponding corrections for distance and angle of the tangent scale.

For the first, the gun position correction, the parallax corrector J is provided as a special part of the shooting table corrector A, as can be seen in Figures 8 and 20–24. The functions to be settled from this are shown in Figure 37. If G, G, represents a gun station, or the centre of a battery on the right or left of the space direction appliance at O, and if from T is drawn the perpendicular $f_1$ and in the horizontal lines the perpendiculars $f_2$ and $e_h$ there results from the shooting triangles G—O—T or from their projection on the horizontal plane, as lateral parallax correction;

(a) For two axial guns:

$$(9) \quad \operatorname{tg} \bar{b} = \frac{f_2}{e_h \pm n} = \frac{b \sin \sigma}{e. \cos h \pm b. \cos \sigma}$$

(b) for three axial guns is obtained from this equation:

$$(10) \quad \operatorname{tg} \bar{b}^1 = b. \frac{\sin \sigma. \cos [h' - h'']}{e. \cos h' \pm b. \cos \sigma}$$

wherein $h'' =$ the angle of the tangent scale.

For the distance variation $e_p$ the following can be taken as a good approximation:

$$(11) \quad -e_p = b. \cos \sigma. \cos h'$$

and then follows for the height variation:

$$(12) \quad \operatorname{tg} h_p = \frac{b. \sin h'. \cos \sigma}{e - b. \cos h'. \cos \sigma}$$

The eccentric axis $J_1$ is carried in the parallax corrector for reproducing the equations, and is driven from the axis $G_1$ through the worm wheel $J_2$ and the worm $J_3$. In the slipper guide of the worm wheel $J_2$ is the movable eccentric $J_6$, which is slid through the slide block $J_7$ (which is provided with diagonal slots) by means of the spindle $J_8$ according to the scale $J_9$ and the handwheel pointer $J_{10}$, and is moved from the centre to correspond to the base $b$. (See Figures 8, 20–24 and 28.) The axis $J_1$ is drawn out into a flange shape at the top and drives the wheel hub $W_{30}$ through the friction disc $W_{29}$ and through this hub the eccentric $W_{31}$, by which the $v_0$—alteration due to wind and travel is compensated. The eccentricity, corresponding to the strength of drift, adjusts the aiming according to the drift scale $W_{32}$ and the pointer $W_{35}'$ by turning the handwheel $W_{34}$; it thus pushes the diagonally slotted slide blocks $W_{36}$ by means of the spindle $W_{35}$ and through these the eccentric $W_{31}$, from the centre of the axis diagonally to the drift direction. The turning movement received by the axis $J_1$, is further led through the gear ring $W_{38}$ (held between friction discs $W_{37}$) and the pinion $W_{39}$, to the gear ring $W_{40}$, to which the range rod $W_6$ is connected through the forked lever $W_0$.

If, now, the range value swings the space direction appliance laterally while following the target, the drift indicator W, which has been placed in the drift direction by the shooting controller, stands still as a result of the counterwise turning of the gear wheels $W_{38}$ $W_{39}$ $W_{40}$, and the eccentric $W_{31}$ is only moved parallel to itself through the axis $J_1$, and thus keeps its position diagonal to the drift direction. Consequently, from the moving of the eccentric frame $W_{41}$ in the target direction the component of the drift for the target direction is always given, and from this the alteration of $v_0$ from time to time, as will be indicated later. This presumes that the shooting direction only varies slightly from the target direction, but if on the other hand, larger lateral corrections have to be considered, it is necessary to set back the eccentric $W_{31}$ towards the scale $W_{42}$ marked "shooting direction"; in this way the same effect is obtained as if the eccentric frame $W_{41}$ has its movement diagonally to the shooting direction.

For the correct adjustment of the lower eccentric $J_6$, the range director adjusts the range gun with the space direction appliance, and places the worm wheel $J_2$ with its slipper guide also in the shooting direction, by means of the worm $J_3$, which is uncoupled from $G_1$ by inserting the turnkey in the square hole $J_4$, which presses in the conical clamp block $J_5$, so that the adjusted eccentricity $b$ corresponds with the base "space direction appliance" "range gun". The eccentric now reproduces the natural position ratios reduced in every lateral direction, and the movement of the eccentric frames $J_{11}$ $J_{12}$ indicates the values $b \cdot \cos 3$ and $b \cdot \sin 3$ respectively.

The shooting table corrector A is attached to the interior of the pendulum head. It consists of a frame $a_1 a_2$ in which the following parts are carried in a series from back to front and are free to turn: The position angle discs $l_g l_k$, the tangent scale valve $a_5$ which carried the tangent scale $a_6$ with the gear segment $a_7$ and tangent scale pinion $a_9$, the distance disc $e_k$, the distance valve $e_s$, the distance valves $e_r e_t$, the tangent scale angle disc $a_{10}$ and the flight time disc $t$. The position angle disc $l_g$ takes its drive from the differential $V_9$, through the gear wheels $l_1 l_2$, the axis $l_3$, the gear wheels $l_4 l_5 l_6$ and the planet wheel mechanism $l_7$, and is first of all swung about the centre "A" into the position angle determined for the space direction appliance. On the right hand side of its centre $a$ it has a diagonal slot $l_8$, through which the slide roller of the $v_0$-slide $g_1$ engages in the position angle disc $l_k$. This likewise possesses a slot $l_9$ whose slope, however, is opposed to that of $l_8$. In the $l_k$ disc there is, further, the radial slot $a_3$, and a third slot is also provided running from the centre "$a$", which slot follows a wavy line in accordance with the product $a_4$ obtained from the shooting table: $a_4$ is the geometrical location of the crossing point of the centre line of the tangent scale $a_6$ when swung about the centre "A", into the position of tangent scale angle for every required position angle and for every distance which can be reached with the particular gun. The position of $a_4$ is ascertained from the cutting points of the tangent scale groups drawn out for 0° 30° 60° position angle. Between the position angle disc $l_{k2}$ and the tangent scale $a_6$ which is carried from the centre $a_s$, is arranged the tangent scale valve $a_5$.

It is guided on one side by the two slide roller $a_{10} a_{11}$ in the slots $a_3 a_4$ of the position angle disc $l_k$, and on the other side it engages with its slide roller $a_{12}$ in the longitudinal slot $a_{13}$ of the tangent scale $a_6$, and with the slide rollers $a_{14}$ in the curved spiral slot $a_{15}$ of the distance disc $e_k$, carried in front of it, which is driven from the axis $V_{24}$ through the back gear $a_{16}$, the distance disc $e_r$ and the differential $a_{17}$, the parallax variation being introduced in accordance with equation 11. The pitch of the curved slot $a_{15}$ is chosen to correspond with the values of the tangent scale which are valid horizontally. By turning the distance disc $e_k$, that is, by adjusting it to some desired distance, the tangent scale valve $a_5$ is thus through the slide roller $a_{14}$ and the curved slot $a_{15}$, pushed in the slots $a_3 a_4$ so far from its zero position that the slide roller $a_{12}$ sets the tangent scale $a_6$ to the tangent scale angle appropriate to the distance chosen. If now, the position angle disc $l_k$, the tangent scale valve $a_5$, the tangent scale $a_6$ and the distance disc $e_k$, are considered as a connected fixed whole, and this system and the point "$a$" are swung into the position angle setting, (that is—relatively the same as swinging the tangent scale $a_6$ about "$a$" for determining $a_3$) the slide roller $a_{12}$ travels in the longitudinal slot $a_{13}$ of the tangent scale $a_6$ and this now determines the tangent scale angle for every tangent scale angle of the shooting table applying to the distance inserted. As, however, the values of the shooting table are only suitable for a certain $v_0$ and for an average atmospheric pressure, the tangent scale angle must now be adapted to the existing shooting conditions.

These functions are discharged by the $v_0$-corrector which is held in the top of the pendulum head $p_1$, in T-shaped slots $g_1$. The valve $g_2$ is provided in the centre with a diagonal slot in which the projections $g_3$ of the eccentric frame $W_{41}$ engages and sets the valve $g_2$ to the value $a \cdot \cos 3''$, corresponding to the drift, wherein "$a$" signifies the drift, as stated on page 24 (page 28 in the German) and $\cos 3''$ is the angle between the shooting direction and drift direction. This movement is imparted to the guiding ring $g_8$ through the two diagonally slotted spikes $g_4 g_6$ and the two valves $g_5 g_7$ and the $v_0$-valve $g_{10}$ slides in the slot of the guiding ring when the position angles disc $l_g$ is turned. From the foregoing, the value $a \cdot \cos 3''$ as $h$ then necessarily follows; for the wind movement and the travel of the carrying body must signify for the projectile (according to the direction of shooting) either an increase or a diminution of the muzzle velocity, or a drift laterally or vertically, or a $v_o$-variation and drift simultaneously. The lateral and vertical drift can now be excluded, as the result is essentially the same, whether the drift of the projectile is due to the air movement or to the inertia of the mass of the projectile; and as previously the wind drift and travel drift, combined in accordance with the parallelogram of forces, were excluded in the drift corrector, so must the $v_o$—which is altered by the drift, now be provided for in the shooting table corrector. Assuming now that the firing is taking place ahead or astern in the direction of travel of the carrying body, the $v_o$ of the projectile is the resultant of the velocity caused by the explosive gases $l$ the velocity of the carrying body. The $v_o$ remains unaltered across the direction of travel, and the increase or reduction of the $v_o$ when the direction of shooting varies from the travel direction follows a cosine function, as in the case of the eccentric movement in $W_{41}$.

The same occurs when the flight track is raised vertically; here the $v_o$-variation resulting from the drift follows the $K_o$ sine function corresponding to the position angle, and with vertical shooting becomes equal to zero, as with the moving of the $v_o$-valve $g_{10}$ in the slot $g_9$. The same also applies to the effect of the wind, and consequently the functions are accurately reproduced.

As a result of the movement of the $v_o$-valve in a radial direction, the position angle disc $l_k$, through its slide roller, is turned forwards or backwards in the opposite direction to the position angle disc $l_g$, and the same occurs if the position of the guiding ring $g_8$ to the centre "$a$" is varied by moving the spike $g_4$, to correspond to the existing temperature, barometric pressure and air humidity. If, now, by turning the disc $g_{12}$ the temperature in the boundary gap $g_{11}$ is inserted, also the barometric pressure by turning the disc $g_{13}$ and the saturation by turning the handwheel $g_{14}$, the daily (atmospheric) influences are correctly allowed for. In addition to this, by turning the handwheel $g_{15}$ an additional movement can be given to the guiding ring $g_8$ by means of the spikes $g_6$, for compensating the $v_o$-reduction resulting from the wear of the barrel through firing.

The position angle and the $v_o$-corrections are now taken from the position angle disc $l_k$ through the gear wheel $i_1$ and led to the differential $a_{17}$. From the other side the movement of the distance disc $e_r$ is given to the differential $a_{17}$ through the gear wheel $i_2$ and the axis $i_3$, whereby the parallax correction for the distance is taken in at the same time by moving the axis $i_3$ (which is provided with diagonal grooves) so that the tangent scale $a_6$ now gives the tangent scale angle applying to the prevailing shooting conditions through the corrections for the position angle and distance.

The tangent scale angle is transmitted through the gear segment $a_7$ to the tangent scale $a_9$, and this now turns the tangent scale disc $a_{10}$. On the other side of "$a$", and symmetrically to the differential $a_{17}$ is also arranged the planet mechanism $l_7$, which combines the movements of the tangent scale disc $a_{10}$ and the position scale disc $l_g$ corresponding to the construction scale. In this way the parallax correction for the position angle is at the same time taken up by moving the axis $l_{10}$, which is provided with diagonal grooves, so that the rotation of $l_7$ now gives the final elevation direction. The elevation direction is led from $l$ through the wheels $l_{11}$ $l_{12}$ to the axis $l_{13}$, which drives the curved disc $k_{23}$ through the gear wheels $l_{14}l_{15}l_{16}$ and gives the elevation direction to the Indicator $G_h$ through the gear wheels $l_{17}l_{18}$, the axis $l_{19}$ and the gear wheels $l_{20}l_{21}$.

The flight time is now determined through the tangent scale disc $a_{10}$ in connection with the flight time disc $t$ and the distance disc $e_1$. For this purpose the three discs are each provided with a curved groove $t_1t_2t_3$, in which travel the slide rollers of the flight time valve $t_4$. The flight time valve also slides in the radial groove $t_5$ of the support $t_6$ which is free to turn. In addition, the distance disc $e_k$, which rises into the region of the position angle, takes up the position angle movement through the distance valve $e_s$, and this movement is transmitted through the groove $t_7$ of the distance disc $e_r$ to the groove $t_8$ of the distance disc $e_t$.

If now the distance disc $e_r$ is turned, the distance disc $e_t$ also runs, and pushes the flight time valve $t_4$ in the support $t_6$ in a radial direction, by means of the slide roller which passes into the groove $t_3$; on the other hand the tangent scale disc, which goes into the position of the tangent scale angle, turns the support $t_6$ about "$a$", as the slide roller of the flight time valve $t_4$ is also led through the groove $t_2$, and the flight time disc is now turned as a result of the two movements, which corresponds to the horizontal flight time. If firing takes place under a position angle, the distance valve $e_s$ causes an additional movement of the distance disc $e_s$ through its slide roller which passes into the distance discs $e_k e_r e_s$, so that the correct flight time for every position angle is now given by turning the flight time disc $t$. The turning movement of $t$ is now transmitted through the back gear $t_{10}$ to the hollow axis $t_{11}$, and through the conical gear wheels $t_{12}t_{13}$ to the flight time spindle $F_1$. In addition the movement of the large wheel of the back gear $t_{10}$ is led through the wheels $t_{14}t_{15}$ to the axis $t_{16}$, which passes it on through the wheels $t_{17}t_{18}$ to the axis $t_{19}$, and finally $t_{19}$ leads it through the wheels $t_{20}t_{21}$ to the indicator $G_t$.

The flight time disc is also provided with a curved groove $d$, for the determination of the twist variation, in which groove runs the slide roller of the twist valve $d_2$, carried by the slipper guide $d_1$. As the twist variation of the projectile is dependent on the flight time, the accurate value of the derivation, is got from the flight time disc $t$, this derivation, together with the lateral parallax correction, being transmitted to the pinions of the differentials $V_3V_4$.

In connection with the latter (as the determinants wanted for the Equations 6 to 12 are now given in the parallax corrector) the method of working of the correction elements is yet to be added. As already said, the moving of the upper eccentric frame $J_{11}$ reproduces the value $b.\cos 3$; consequently the diagonally grooved sleeve which slides to and fro with the frame, and also the eccentric $J_{14}$ which can revolve in the support $J_{15}$, are adjusted to $b.\cos 3$. If, now, the position angle axis, through the gear wheels $J_{16}J_{17}$ swings the eccentric $J_{14}$ into the position angle setting, the eccentric frame $J_{18}$ is pushed in its guide $J_{19}$ to correspond with the value $b.\cos 3.\cos h$, and imparts the movement through the diagonal grooves of its left hand slide block to the diagonally grooved sleeve $J_{20}$. This pushes the distance axis $i_3$, so that through the diagonal grooves of the axis $i_3$, the gear wheel $i_2$ is twisted round the distance variation corresponding to Equation 11, in the opposite direction to the inner differential wheel.

The variation of the position angle is inserted in a similar way. The value $b \sin h.\cos 3$ is given by the cross frame $J_{21}$. If, then, the diagonally grooved sleeve $J_{22}$ in the eccentric $J_{23}$ is pushed by the frame $J_{21}$, and if the eccentric $J_{23}$ is turned by the rack $J_{24}$, which is moved according to $b.\cos 3.\cos h$ by the eccentric frame $J_{18}$ and according to $e$ by the distance axis $i_3$, the movement of the eccentric $J_{23}$ reproduces the variation of the position angle corresponding to Equation 12; this variation is transmitted through the eccentric frame $J_{25}$ to the position angle axis $l_{10}$, which twists the wheel $l_6$ correspondingly to the variation in the position angle, by means of its diagonal grooves.

For determining the lateral parallax for bi-axial guns, the movement of the eccentric frame $J_{12}$ and the sliding of the twist valve $d_2$ are transmitted to the diagonally grooved disc $J_{26}$, and thereby the eccentric $J_{27}$ is set to the value $b \sin 3 - d$, in which $d$ represents the twist variation. The distance is also taken from the distance axis $i_3$ to the diagonally grooved sleeve $J_{28}$, which sets the lever $J_{29}$ to the value $e$. This causes the position angle axis $l_{10}$ to turn the sleeve $J_{28}$ and the lever $J_{29}$ into the position angle setting, by means of the gear wheels $J_{30} J_{31}$, so that the lifting movement of the lever $J_{29}$ now indicates the value $e.\cos \bar{h}$. The sleeve $J_{28}$ is now pushed by the upper eccentric frame $J_{11}$ about $b.\cos 6$ and the eccentric $J_{27}$ turned through the whole movement, i. e. the eccentricity is divided by $e.\cos \bar{h}=b.\cos 6$. The vertical movement of the eccentric $J_{27}$ consequently reproduces the value of Equation 9, and in addition contains the true twist correction for every position angle. The movement is now transmitted from the eccentric frame $J_{32}$ through the rack $J_{33}$ to the pinion $J_{34}$, and from $J_{34}$ across the conical gear wheels $J_{35} J_{36}$ to the differential $V_3$.

For three-axial guns the vertical movement of the eccentric frame $J_{32}$ is now transformed by turning the slotted disc $J_{38}$, carried in the rack $J_{37}$, by means of the pinion axis $J_{39}$, by which the slot of $J_{38}$ is brought into an angular position corresponding to the elevation. The rack $J_{37}$ thus gives the true value of Equation 10 to the pinion $J_{40}$ and through the conical gear wheels $J_{41} J_{42}$ to the differential $V_4$.

By this means the range elements are determined and the indicators can now pass them on to the gun receiver, or if required they can operate the relay controls directly for the motor drive. For the transmission from the indicators to the receiver a mechanical-electrical-mechanical motive succession is provided, by means of balance wheels and double balanced armatures, which are fed forward synchronously unit for unit between two electromagnets excited alternately from separate circuits. A battery of accumulators is provided in the lower part of the pedestal of the space direction appliance to supply the current, the zero-current conductor being taken from the middle cell and, as indicated diagrammatically in Figure 40, closing the circuit to the end cells through the indicators and receiver. The accumulator N at the same time supplies current to the motor M, which drives the pressure pump D. The current is taken to the space direction appliance through the cable $N_1$, which is connected by the plug $N_2$. Sliding contacts are provided for the current inside the space direction appliance on account of the revolving and swinging movements. The current is taken on to the receiver through the cable $N_4$, which is connected to the space direction appliance by the plug $N_3$.

The indicators are all of uniform construction, so that it will be sufficient to describe the method of working of the indicator $G_s$ for example. As is seen from the section in Figure 2, the driving shaft $G_9$ with the mechanical portion of the indicator is carried in the eyebearing of the housing cover $G$.

The magnets are arranged at one side of the centre and the contacts on the bottom surface. The rotation, which here corresponds to the lateral direction, is taken to the driving shaft through the wheels $G_5$ to $G_8$, and is indicated in the window of the housing cover on the scale $G_{10}$ of the balance wheel $G_{11}$, which is firmly attached to the axis $G_9$.

The motion is further led to the scale $G_{15}$, through the pinion $G_{12}$ of the axis $G_9$ and across the gear wheel $G_{13}G_{14}$. The drive and transmission ratios are so chosen that one revolution of the scale $G_{15}$ equals 64 scale divisions, and the movement from one division to another of this scale corresponds to 100 units, or one revolution of scale $G_{10}$. The balance wheel $G_{11}$ is thus provided with 100 teeth, in which the ratchet levers $G_{16}G_{17}$ of the swinging armature $G_{18}$ (?) catch, when the balance wheel is turned under the action of the springs $G_{33}$, and so cause the swinging armature $G_{18}$ to take part in the motion of the balance wheel. The ratchet levers $G_{16}G_{17}$ are in addition driven by the magnet armature $G_{19}$ through their tappets. The swinging pendulum $G_{18}$ projects above into an insulated fulcrum $G_{20}$, which works on the contact springs $G_{21}G_{22}$. The contact springs are held in the floor insulation and connected to the + and − poles through the screws $G_{23}G_{24}$. Behind the contact spring $G_{21}G_{22}$ is arranged the contact bridge $G_{25}$ with the contact screws $G_{26}G_{27}$, which gives the incoming current to the magnet spools $G_{28}G_{29}$. The current goes from the magnet spools to the contact bridge $G_{25}$ of the receiver, from where it flows, after passing through the receiver magnets and the contact bridge $G_{30}$ of the receiver, to the middle wire $G_{32}$.

Assume now that the two ratchet levers $G_{16}G_{17}$ are engaging with the balance wheels $G_{11}$; if now the balance wheel is turned about ¼ of a tooth, the fulcrum $G_{20}$ presses the contact spring lying in the direction of turning for example $G_{22}$, on to the contact screw $G_{26}$. This causes the magnet spools to receive a current impulse and the magnet armature $G_{12}$ is attracted by $G_{28}$ and repelled from $G_{29}$; it moves rapidly against the swinging armature $G_{18}$ and consequently strikes the ratchet lever $G_{17}$ from the balance wheel.

The swinging armature $G_{18}$ now flies back into the rest position under the action of the springs $G_{33}$ and owing to the momentum, still further over to the other side, so that the circuit which has been closed by the contact spring $G_{22}$ is disconnected, and the one which has been momentarily opened is closed by the contact spring $G_{21}$. The polarity of the magnet spools, is consequently reversed momentarily, and the magnet armature $G_{19}$ turns back into the zero position, while the balance wheel turns still further, and the ratchet levers, engaging in the next tooth of the balance wheel, allow the swinging pendulum to give a new current impulse to the magnet spools, so that the whole process is repeated. The movements which occur in the receivers at the gun follow a similar course, the action only differing in that there the ratchet levers are not turned by the balance wheel, but the ratchet levers feed forward the balance wheels from unit to unit. The range elements are thus correctly given from the receivers for every second; when the barrel takes up the indicated position, the shot is automatically fired.

It is now quite self-evident, that instead of the one shooting table and parallax corrector, two or more may be provided, and that without anything further the space direction appliance is suitable for combating both land and sea targets.

In fire control with the space direction appliance, the allowances for loading delays and command delays are completely done away with, owing to the constant holding of the target. The determination of the target co-ordinates is now entrusted to a man who, relieved of all physical exertion, can devote himself entirely to this problem.

All known factors are fixed with all the accuracy technically possible, and included automatically in the range elements and for the inclusion of the unknown influences, the shooting controller has in the drift corrector a method by which he can lay the point of explosion right in the target easily and without calculation or command, according to his observations.

The space direction appliance consequently places the combating of air targets above all, on a new basis which guarantees a greater certainty of hitting the target.

I claim:—

1. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support, which pendulum provides the fixed reference plane necessary for the determination of the target co-ordinates, lever arms arranged symmetrically around the vertical reverse pendulum axis, spring accumulators acting on said lever arms and compensating the mass pressures of the pendulum, and means for coupling the spring accumulators elastically with the outer Cardan ring.

2. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support, a measuring device arranged in the pendulum head for the determination of the lateral, vertical and distance co-ordinates of the target, with reference to a fixed reference plane, which may be held on the target, three hydraulic power drives arranged in the pendulum body operating the lateral, vertical and distance determination devices, and spring pistons acting on mutually-coupled driving devices with which from the quantities of working medium passing through the three hydraulic power drives the values of the momentary amount of movement determined from which the allowances for the relative movement, target appliance, during the flight time of the projectile are ascertained.

3. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support, a measuring device arranged in the pendulum head which, for the determination of the lateral, vertical and distance co-ordinates of the target with reference to a fixed reference plane, may be held on the target, three hydraulic power drives arranged in the pendulum body, a pressure pump adapted to aspire the working medium for actuating the power drives from the pendulum body and for pressing it into the pendulum rod and holding it therein under a uniform pressure, and an electric motor arranged below at the pendulum body for driving the pressure pump.

4. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support, a carrying rod connected in the form of a parallelogram with the vertical pendulum axis, the carrying rod having a range compass and travel, wind and shooting indicators for ascertaining the drift of the projectile resulting from the wind and from the travel of the body carrying the guns and the space direction appliance, a device by which the carrying rod with range compass may be swung into the drift direction ascertained, and a device by which the shooting indicator may be swung about the carrying rod axis and about a horizontal axis to the probable point of impact, whereby a double action eccentric device, arranged in the shooting indicator for the insertion of the drift strength ascertained, gives the corresponding components of the drift for the horizontal and vertical angle for the time being between the shooting and drift directions, said component being given on a transmission organ which passes it into the space direction appliance.

5. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support, a carrying rod connected in the form of a parallelogram with the vertical pendulum axis, the carrying rod having a range compass and travel, wind and shooting indicators, a transmitting device adapted to indicate the correction of drift in the space direction appliance, and a slide roller container arranged on the outer Cardan ring, said container being capable of rotation and also of being tilted about an axis lying perpendicularly to the drift direction by means of the transmission device, crossed axes arranged in the reversion pendulum body and adapted to have been previously turned about the vertical pendulum, to which crossed axes by means of toothed wheels and gear segments in connection with the slide roller container, the tilting angles corresponding with the drift and the tilting angles of the outer Cardan ring with regard to the fixed reference plane created in the space direction appliance for ascertaining the tilting angles parallel to and perpendicular to the trunnion axis of the gun are taken up which values are then led to suitably form correction elements arranged in the pendulum body.

6. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support with a measuring device, a carrying rod having compass, travel, wind and shooting indicators, means for taking up the tilting angles parallel to and perpendicular to the trunnion axis of the gun, correction elements adapted to ascertain the corrections which are necessary for eliminating the influence of the tilting, and adding mechanism consisting of differential gears arranged one behind the other, by means of which the ascertained corrections may be combined with the momentary target co-ordinate, and a connecting device by which the shooting elements for guns having two or three axes through a corresponding coupling and uncoupling of the differentials may be combined at will.

7. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support with a measuring device, a carrying rod having a range compass, travel, wind and shooting indicators, means for taking up the tilting angles parallel to and perpendicular to the trunnion axis of the gun, correction elements, means for combining the corrections with the momentary co-ordinates, and a parallax corrector by which the co-ordinates of the space direction appliance for the probable striking point are transformed into shooting co-ordinates through adjustable eccentrics arranged in the parallax corrector and which in correspondence with the distances and the angles under which the three points lie with regard to one another: space direction appliance, probable point of impact, and gun, vary their eccentricity and their relative eccentric position.

8. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support with a measuring device, a carrying rod having a range compass, travel, wind and shooting indicators, means for taking up the tilting angles parallel to and perpendicular to the trunnion axis of the gun, correction elements, means for combining the corrections with the momentary target co-ordinates, means for transforming the co-ordinates of the space direction appliance into shooting co-ordinates, a shooting table corrector in which by mutual displacement and turning leaf formed discs with curved grooves, which are arranged one above another and the subsequent displacement of slide valves the $v_0$-variation being the result of the day influences, the movement of the body carrying the gun and space direction appliance, and the wear through shooting of the barrel being determined by ascertaining the tangent scale angle, the tangent scale angle, the twist and the flight time being adapted to the position angle for the time being under which the probable point of impact lies.

9. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support having a measuring device, a carrying rod having a range compass, travel, wind and shooting indicators, means for taking up the tilting angles parallel to and perpendicular to the trunnion axis of the gun, correction elements, means for combining the corrections with the momentary target co-ordinates, means for transforming the co-ordinates of the space direction appliance into shooting co-ordinates, means for considering the day influences, the $v_0$-variation resulting from the movement of the body carrying the gun and space direction appliance and the $v_0$-variation resulting from the wear through the shooting of the barrel, means for adapting the tangent scale angle, the twist and the flight time to the position angle for the time being, mechanical and electrical indicators arranged at the pendulum head which are adapted to transmit the obtained range elements, i. e. the lateral direction, the lateral allowance about the third axis, the vertical direction and the tempering to the gun by means of balance wheels which are driven from the corresponding axes if the space direction appliance and double armatures which swing to and fro between two magnet spools excited alternatively from separate circuits and which synchronize with double armatures in a similarly built receiver which is arranged on the guns, and two scale discs arranged coaxially and connected by toothed wheels which are switched on from unit to unit and on which scales through an opening in the housing through which the inserted values can be read off.

10. Space direction appliance, particularly for the automatic determination of the shooting data necessary for combating air targets with guns having two or three axes, mounted on moving platforms, comprising a foundation rigidly connected with the platform, a Cardan support carried on springs, a corrected reverse pendulum oscillating in the support having a measuring device, a carrying rod having a range compass, travel, wind and shooting indicators, means for taking up the tilting angles parallel to and perpendicular to the trunnion axis of the gun, correction elements, means for combining the connections with the momentary target co-ordinates, means for transforming the co-ordinates of the space direction appliance into shooting co-ordinates, means for considering the day influences the $v_0$-variation resulting from the movement of the body carrying the gun and space direction appliance and the $v_0$-variation resulting from the wear through shooting of the barrel, means for adapting the tangent scale angle, the twist and the flight time to the position angle for the time being, mechanical and electrical indicators, which pass on the obtained range elements to the gun so that owing to the movement elements all engaging with one another automatically, for the operation of the space direction appliance, and a firing controller and a single range director.

In testimony whereof I affix my signature.

LEOPOLD SCHMIDT